(12) United States Patent
Tada

(10) Patent No.: US 12,417,653 B2
(45) Date of Patent: Sep. 16, 2025

(54) DETECTION DEVICE

(71) Applicant: Japan Display Inc., Tokyo (JP)

(72) Inventor: Masahiro Tada, Tokyo (JP)

(73) Assignee: Japan Display Inc., Tokyo (JP)

( * ) Notice: Subject to any disclaimer, the term of this patent is extended or adjusted under 35 U.S.C. 154(b) by 322 days.

(21) Appl. No.: 18/201,561

(22) Filed: May 24, 2023

(65) Prior Publication Data

US 2023/0410552 A1 Dec. 21, 2023

(30) Foreign Application Priority Data

May 26, 2022 (JP) .................................. 2022-086300

(51) Int. Cl.
*G06V 40/145* (2022.01)
*G06F 21/32* (2013.01)

(52) U.S. Cl.
CPC ............ *G06V 40/145* (2022.01); *G06F 21/32* (2013.01)

(58) Field of Classification Search
CPC .............................. G06V 40/145; G06F 21/32
See application file for complete search history.

(56) References Cited

U.S. PATENT DOCUMENTS

| | | | | |
|---|---|---|---|---|
| 2021/0112056 | A1* | 4/2021 | Lee ........................... | G06F 1/16 |
| 2022/0061669 | A1* | 3/2022 | Caizzone ........... | A61B 5/02427 |
| 2022/0096007 | A1* | 3/2022 | Robinson ........... | A61B 5/02028 |
| 2023/0410552 | A1* | 12/2023 | Tada .................. | G06V 40/1318 |
| 2024/0346120 | A1* | 10/2024 | Khuri-Yakub .......... | G06F 21/32 |

FOREIGN PATENT DOCUMENTS

JP    2017-091186 A    5/2017

* cited by examiner

*Primary Examiner* — Edward Park
(74) *Attorney, Agent, or Firm* — K&L Gates LLP

(57) ABSTRACT

A detection device includes a ring-shaped housing wearable on a living body, a first light source provided inside the housing and configured to emit near-infrared light, an optical sensor capable of detecting the near-infrared light, and a control circuit configured to control lighting of the first light source. The control circuit is configured to measure a perfusion index of blood flow based on image data acquired by the optical sensor when being irradiated with the near-infrared light, determine the image data to be a vein image when the perfusion index is equal to or higher than a predetermined value, and determine the image data to be a dermatoglyphic image of a biological surface when the perfusion index is lower than the predetermined value.

8 Claims, 15 Drawing Sheets

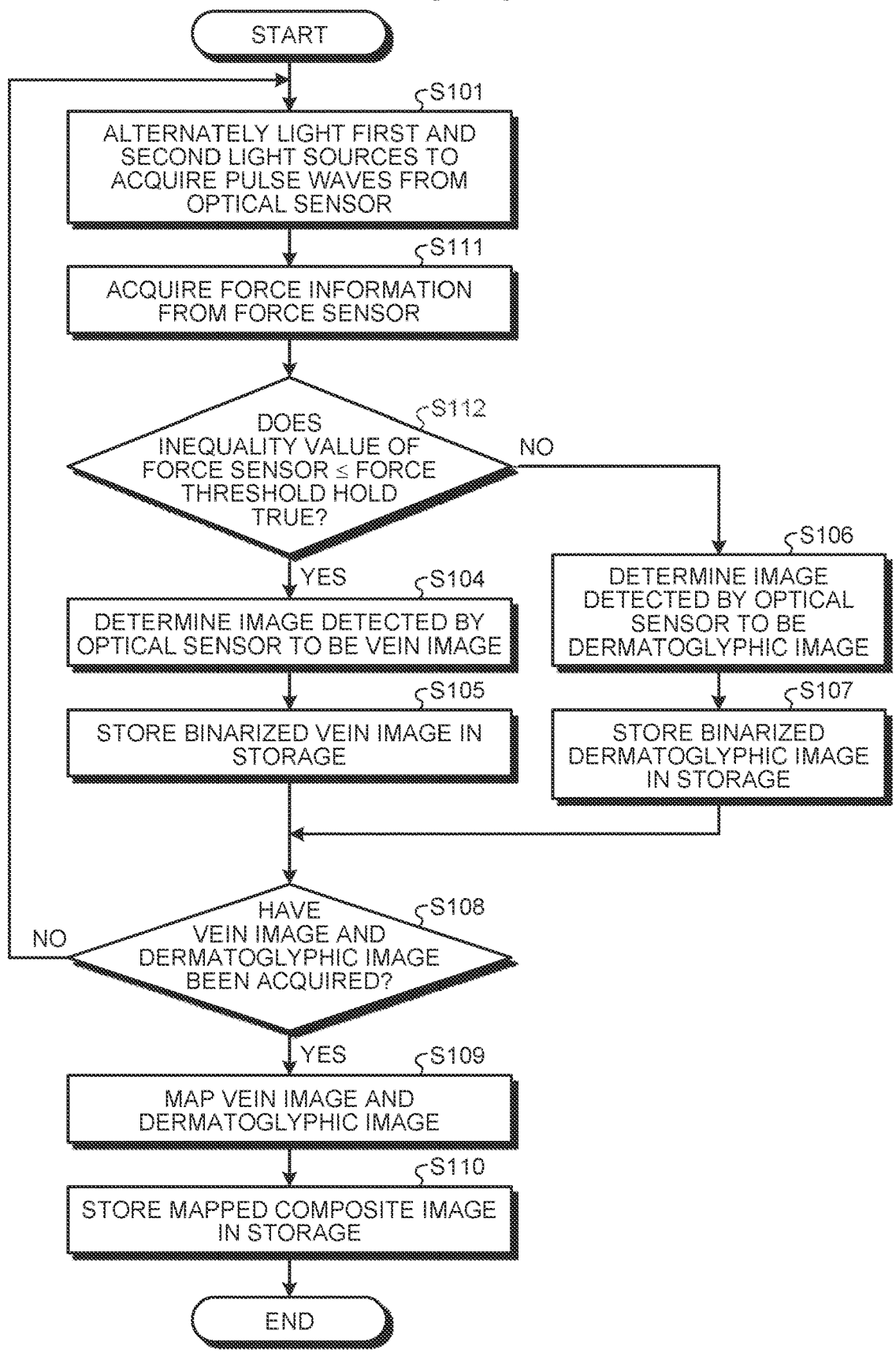

DETECTION DEVICE

CROSS-REFERENCE TO RELATED APPLICATION

This application claims the benefit of priority from Japanese Patent Application No. 2022-086300 filed on May 26, 2022, the entire contents of which are incorporated herein by reference.

BACKGROUND

1. Technical Field

The present invention relates to a detection device.

2. Description of the Related Art

For authenticating individuals, authentication devices are known that use features of a living body to perform the personal authentication. Japanese Patent Application Laid-open Publication No. 2017-091186 discloses that the distance to the living body and the posture of the living body are determined from a captured image, corrections of the distance to the living body and the posture of the living body are instructed based on the determination, and the degree of similarity between the feature information extracted from the image and the stored feature information is compared.

For example, in a ring-type biometric sensor that detects biometric information such as pulsation and a blood oxygen saturation level ($SpO_2$), a device that calculates a biometric authentication function for associating the sensor with a wearer is large and heavy. Therefore, conventional authentication devices are difficult to be always worn in daily life.

It is an object of the present invention to provide a detection device capable of being always worn and capable of detecting a plurality of different types of images.

SUMMARY

A detection device according to an embodiment of the present disclosure includes a ring-shaped housing wearable on a living body, a first light source provided inside the housing and configured to emit near-infrared light, an optical sensor capable of detecting the near-infrared light, and a control circuit configured to control lighting of the first light source. The control circuit is configured to measure a perfusion index of blood flow based on image data acquired by the optical sensor when being irradiated with the near-infrared light, determine the image data to be a vein image when the perfusion index is equal to or higher than a predetermined value, and determine the image data to be a dermatoglyphic image of a biological surface when the perfusion index is lower than the predetermined value.

A detection device according to an embodiment of the present disclosure includes a ring-shaped housing wearable on a living body, a first light source provided inside the housing and configured to emit near-infrared light, an optical sensor capable of detecting the near-infrared light, a force sensor capable of detecting force of an object inserted in a through-hole of the housing in different states of the object, and a control circuit configured to control lighting of the first light source. The control circuit is configured to determine image data acquired by the optical sensor when being irradiated with the near-infrared light to be a vein image when a value of the force sensor is equal to or lower than a force threshold, and determine the image data to be a dermatoglyphic image of a biological surface when the value of the force sensor is higher than the force threshold.

BRIEF DESCRIPTION OF THE DRAWINGS

FIG. 16 is a flowchart illustrating an exemplary processing procedure performed by the detection device according to the second embodiment.

DETAILED DESCRIPTION

Figure 1:
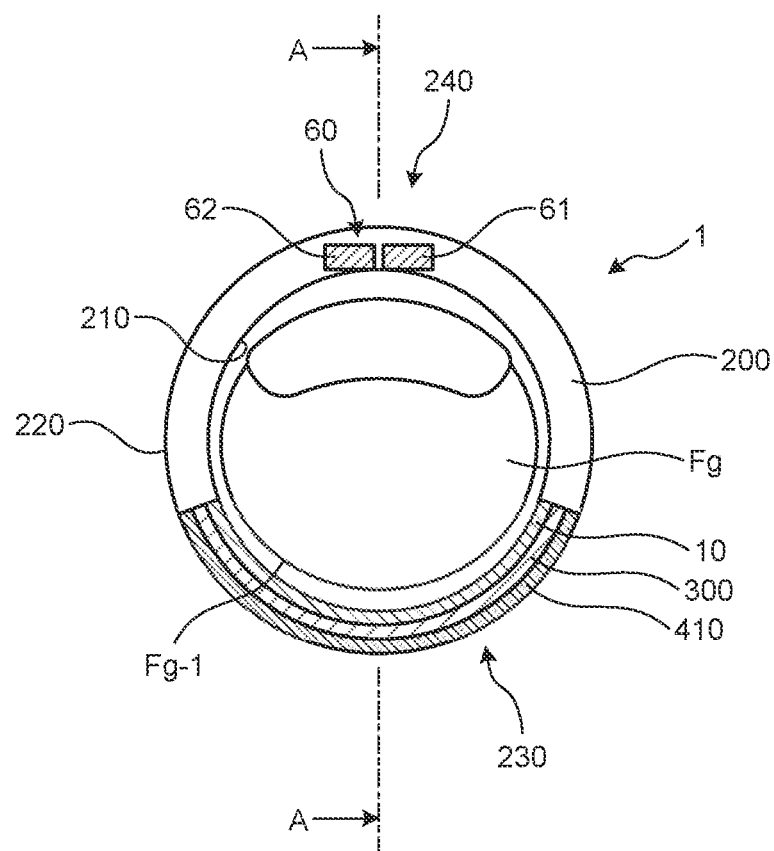
FIG. 1 is a schematic view illustrating a component arrangement example in a state where a finger is accommodated inside a detection device according to a first embodiment, when viewed from one end side of a housing.

The following describes modes (embodiments) for carrying out the present invention in detail with reference to the drawings. The present invention is not limited to the description of the embodiments to be given below. Components to be described below include those easily conceivable by those skilled in the art or those substantially identical thereto. In addition, the components to be described below can be combined as appropriate. What is disclosed herein is merely an example, and the present invention naturally encompasses appropriate modifications easily conceivable by those skilled in the art while maintaining the gist of the invention. To further clarify the description, the drawings may schematically illustrate, for example, widths, thicknesses, and shapes of various parts as compared with actual aspects thereof. However, they are merely examples, and interpretation of the present invention is not limited thereto. The same component as that described with reference to an already mentioned drawing is denoted by the same reference numeral through the description and the drawings, and detailed description thereof may not be repeated where appropriate.

In the present specification and claims, in expressing an aspect of disposing another structure above a certain structure, a case of simply expressing "above" includes both a case of disposing the other structure immediately above the certain structure so as to contact the certain structure and a case of disposing the other structure above the certain structure with still another structure interposed therebetween, unless otherwise specified.

First Embodiment

Detection Device

Figure 2:
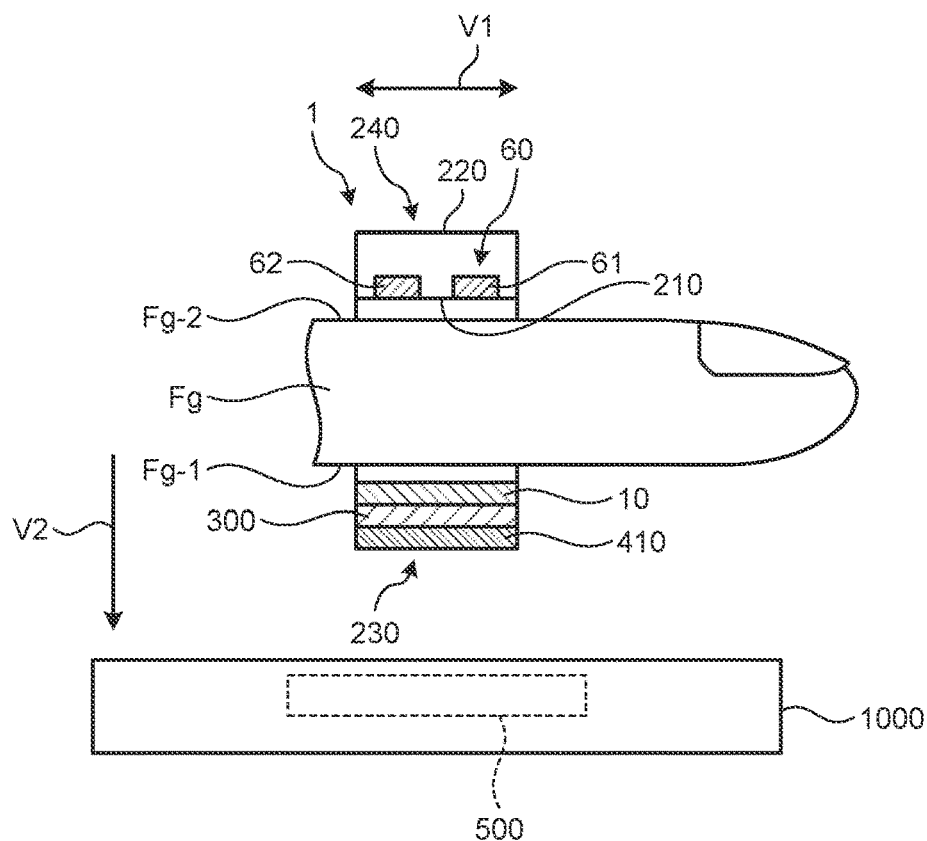
FIG. 2 is a schematic sectional view taken along section A-A illustrated in FIG. 1.
Figure 3:
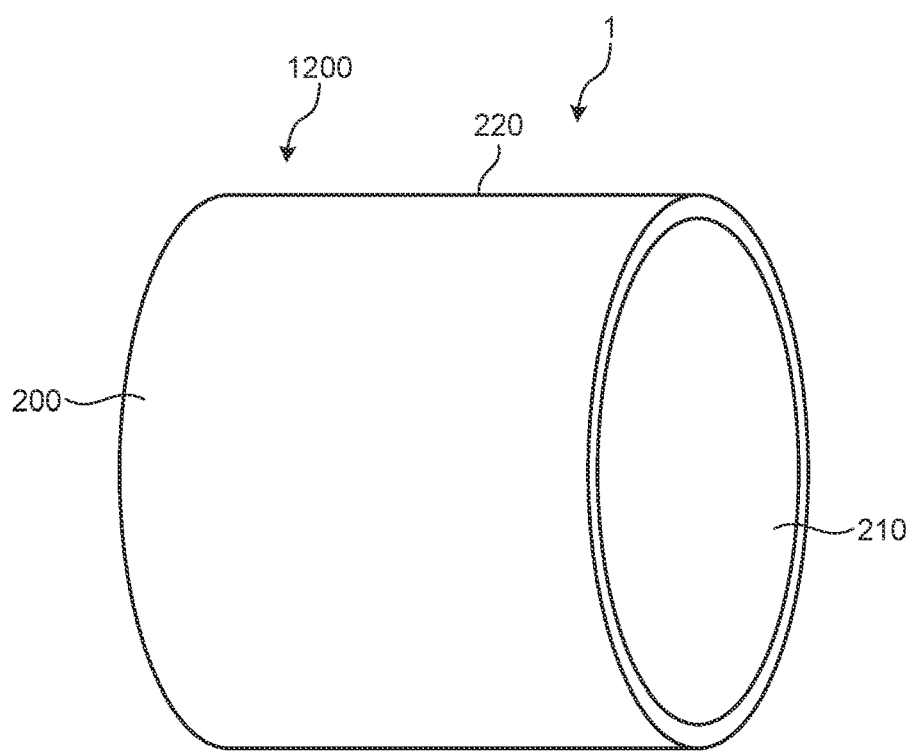
FIG. 3 is an external view of the detection device illustrated in FIG. 1 when not being worn.

FIG. 1 is a schematic view illustrating a component arrangement example in a state where a finger is accommodated inside a detection device according to a first embodiment, when viewed from one end side of a housing. FIG. 2 is a schematic sectional view taken along section A-A illustrated in FIG. 1. FIG. 3 is an external view of the detection device illustrated in FIG. 1 when not being worn.

A detection device 1 illustrated in FIGS. 1 and 2 is a finger ring-shaped device that can be worn on and removed from a person to be authenticated, and is worn on a finger Fg of the person to be authenticated. The term "finger Fg" includes, for example, a thumb, an index finger, a middle finger, a ring finger, and a little finger, and denotes an example of a living body. The person to be authenticated is a person whose identity is to be verified by the detection device 1, and is an example of the living body. The detection device 1 includes a housing 200, a light source 60, an optical sensor 10, a battery 300, and a wireless power receiving element 410. The detection device 1 is operated by electric power supplied from the battery 300. The detection device 1 is configured to wirelessly receive power through the power receiving element 410 and charge the battery 300. The detection device 1 may include a wristband.

As illustrated in FIG. 3, the housing 200 is formed in a ring shape wearable on the finger Fg of the person to be authenticated, and has an inner diameter sized according to the size of the finger Fg that wears the housing 200. The housing 200 is formed in the ring shape (annular shape) from a material such as a ceramic, a synthetic resin, a metal, or an alloy. In the present embodiment, the housing 200 is formed of a ceramic to obtain a higher efficiency of power transmission than that obtained by a metal housing formed of a metal. The housing 200 has an inner peripheral surface 210 and an outer peripheral surface 220. As illustrated in FIG. 2, the housing 200 is formed to have a size allowing movement in an attach/detach direction V1 with respect to the finger Fg. The inner peripheral surface 210 is a surface that contacts and faces the finger Fg located on the housing 200. The outer peripheral surface 220 is a surface that comes in proximity to or in contact with another object as the finger Fg wearing the housing 200 moves.

As illustrated in FIGS. 1 and 2, the housing 200 is provided therein with a plurality of the light sources 60, the optical sensor 10, the battery 300, and the power receiving element 410. The housing 200 is provided with the optical sensor 10, the battery 300, and the power receiving element 410 in a first area 230 that is approached by a finger pulp Fg-1 when the housing 200 is worn on the finger Fg. The finger pulp Fg-1 is located inside the finger Fg when the hand is closed. The first area 230 is an area set below the housing 200. In the housing 200, the optical sensor 10, the battery 300, and the power receiving element 410 are arranged in this order from the inner peripheral surface 210 side. That is, the arrangement in the housing 200 is made so as to locate the power receiving element 410 near the outer peripheral surface 220. The optical sensor 10, the battery 300, and the power receiving element 410 can be provided therebetween with, for example, a member of the housing 200 and an insulating member.

When the housing 200 is worn on the finger Fg, the power receiving element 410 is located closer to the outer peripheral surface 220 on the finger pulp Fg-1 side. The first area 230 of the housing 200 is set based on an area facing the finger pulp Fg-1. The housing 200 may be configured such that the optical sensor 10 is exposed from the inner peripheral surface 210 or accommodated near the inner peripheral surface 210. The housing 200 is configured such that the power receiving element 410 is accommodated near the outer peripheral surface 220, and a magnetic field passes through the housing 200. The power receiving element 410 is provided in the housing 200 so as to be capable of being supplied with the power from the battery 300. With this configuration, when the person to be authenticated operates an operation target object 1000, the housing 200 of the detection device 1 can move in an approaching direction V2 to come closer to a power supply device 500 of the operation target object 1000. The power supply device 500 is a device that wirelessly supplies the power, and is incorporated in the operation target object 1000.

The housing 200 is provided with the light sources 60 in a second area 240 close to a finger dorsum Fg-2 when the housing 200 is worn on the finger Fg. The finger dorsum Fg-2 is located outside of finger Fg when the hand is closed. The second area 240 is an area set above the housing 200 and is an area facing the first area 230. The housing 200 has the first area 230 and a second area 24 located above the first area 230. The second area 240 is provided so that the light sources 60 can emit light rays toward the optical sensor 10.

Figure 4:
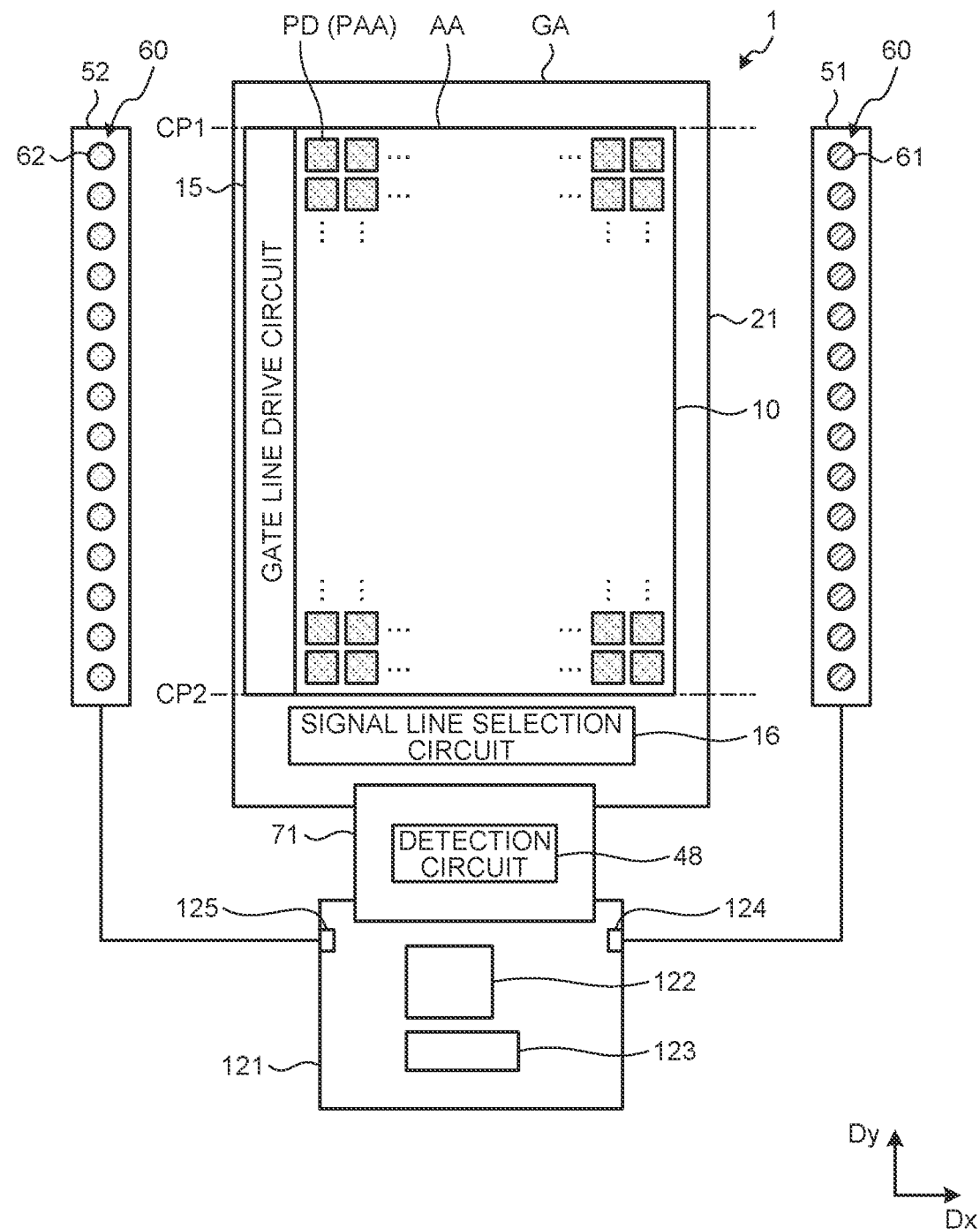
FIG. 4 is a configuration diagram illustrating an example of light sources and an optical sensor of the detection device according to the first embodiment.

FIG. 4 is a configuration diagram illustrating an example of the light sources 60 and the optical sensor 10 of the detection device 1 according to the first embodiment. In the example illustrated in FIG. 4, the optical sensor 10 includes a sensor substrate 21. The light sources 60 include a plurality of first light sources 61 and a plurality of second light sources 62. In FIGS. 1 and 2 explained above, to simplify the explanation, the number of the light sources 60 is reduced from the actual number.

The sensor substrate 21 is electrically coupled to a control substrate 121 through a flexible printed circuit board 71. The flexible printed circuit board 71 is provided with a detection circuit 48. The control substrate 121 is provided with a control circuit 122 and a power supply circuit 123. The control circuit 122 is, for example, a field-programmable gate array (FPGA). The control circuit 122 supplies control signals to the optical sensor 10, a gate line drive circuit 15, and a signal line selection circuit 16 to control detection operations of the optical sensor 10. The control circuit 122 supplies control signals to the first and the second light sources 61 and 62 to control lighting or non-lighting of the first and the second light sources 61 and 62. The power supply circuit 123 supplies voltage signals including, for example, a sensor power supply signal VDDSNS (refer to FIG. 7) to the optical sensor 10, the gate line drive circuit 15, and the signal line selection circuit 16. The power supply circuit 123 supplies a power supply voltage to the first and the second light sources 61 and 62.

The sensor substrate 21 has a detection area AA and a peripheral area GA. The detection area AA is an area provided with a plurality of photodiodes PD included in the optical sensor 10. The peripheral area GA is an area between the outer perimeter of the detection area AA and the ends of the sensor substrate 21, and is an area not overlapping the photodiodes PD.

One side CP1 of the four sides of the detection area AA that form a boundary between the rectangular detection area AA and the peripheral area GA serves as one end of the first area 230. Other one side CP2 of the four sides of the detection area AA located in a position facing the one side with the detection area AA interposed therebetween serves as the other end of the first area 230.

The gate line drive circuit 15 and the signal line selection circuit 16 are provided in the peripheral area GA. Specifically, the gate line drive circuit 15 is provided in an area extending along a second direction Dy in the peripheral area GA. The signal line selection circuit 16 is provided in an area extending along a first direction Dx in the peripheral area GA, and is provided between the optical sensor 10 and the detection circuit 48.

The first direction Dx is one direction in a plane parallel to the sensor substrate 21. The second direction Dy is one direction in the plane parallel to the sensor substrate 21, and is a direction orthogonal to the first direction Dx. The second direction Dy may non-orthogonally intersect the first direction Dx. A third direction Dz is a direction orthogonal to the first direction Dx and the second direction Dy, and is a direction normal to the sensor substrate 21.

The first light sources 61 are provided on a first light source base material 51, and are arranged along the second direction Dy. The second light sources 62 are provided on a second light source base material 52, and are arranged along the second direction Dy. The first light source base material 51 and the second light source base material 52 are electrically coupled, through terminals 124 and 125, respectively, provided on the control substrate 121, to the control circuit 122 and the power supply circuit 123. The first light sources 61 and the second light sources 62 are provided along the finger Fg in the attach/detach direction V1 (refer to FIG. 2), and are arranged so as to face the optical sensor 10.

For example, inorganic light-emitting diodes (LEDs) or organic electroluminescent (EL) diodes (organic light-emitting diodes (OLEDs)) are used as the first light sources 61 and the second light sources 62. The first light sources 61 and the second light sources 62 emit first light and second light, respectively, having different wavelengths. In the present embodiment, the first light sources 61 emit near-infrared light having a wavelength of 880 nm. The second light sources 62 emit red light having a wavelength of 665 nm. During detection, the first light sources 61 and the second light sources 62 are alternately lit up. Therefore, the photodiodes PD alternately receive reflected light of the red light and the near-infrared light.

The reflected light of the near-infrared light contains information for detecting a vascular pattern. Red blood cells included in blood contain hemoglobin. The near-infrared light emitted from the first light sources 61 can be easily absorbed by hemoglobin. In other words, the absorption coefficient of near-infrared light by hemoglobin is higher than that by the other portions in the body. Therefore, the vascular pattern of, for example, veins can be detected by reading the amount of light received by the photodiodes PD, and identifying locations where the amount of the received infrared light is relatively smaller.

The reflected light of the near-infrared light and the red light contains information for measuring the oxygen saturation level in the blood (hereinafter, called "blood oxygen saturation level" ($SpO_2$)). The blood oxygen saturation level ($SpO_2$) refers to a ratio of an amount of oxygen actually bound to hemoglobin to the total amount of oxygen under the assumption that the oxygen is bound to all the hemoglobin in the blood.

The near-infrared light can be easily absorbed by hemoglobin. As the amount of hemoglobin increases, the absorbed amount of near-infrared light increases, and the amount of light received by the photodiode PD decreases. That is, the total amount of hemoglobin is obtained from the amount of the received reflected light of the near-infrared light.

The hemoglobin has a dark red color when not bound to oxygen, and has a bright red color when bound to oxygen. Therefore, the absorption coefficient of the hemoglobin for absorbing the red light differs between when the hemoglobin is bound to oxygen and when it is not bound to oxygen. As a result, the amount of the reflected light of the red light increases as the hemoglobin bound to oxygen increases in the blood. In contrast, the amount of the reflected light of the red light decreases as the hemoglobin not bound to oxygen increases in the blood. Thus, the amount of the hemoglobin bound to oxygen is relatively obtained based on the amount of the received reflected light of the red light.

Then, by comparing the obtained total amount of the hemoglobin with the amount of the hemoglobin bound to oxygen, the ratio of the amount of oxygen actually bound to the hemoglobin (blood oxygen saturation level ($SpO_2$)) can be obtained. As described above, the detection device 1 includes the first and the second light sources 61 and 62, and therefore, can detect information on the living body in the finger Fg or the like by performing the detection based on the first light and the detection based on the second light. The detection device 1 can supply the information on the living body including, for example, the blood oxygen saturation level and pulsation to the control substrate 121 through the flexible printed circuit board 71.

In the present disclosure, the wavelengths of the light emitted from the first and the second light sources 61 and 62 are not limited to those described above. The first light sources 61 only need to emit near-infrared light having a wavelength of from 800 nm (inclusive) to 1000 nm (exclusive). The second light sources 62 only need to emit red light having a wavelength of from 600 nm (inclusive) to 800 nm (exclusive).

The arrangement of the first and the second light sources 61 and 62 illustrated in FIG. 4 is merely exemplary, and may be changed as appropriate. For example, the first and the second light sources 61 and 62 may be arranged on each of the first and the second light source base materials 51 and 52. In this case, a group including the first light sources 61 and a group including the second light sources 62 may be arranged in the second direction Dy, or the first and the second light sources 61 and 62 may be alternately arranged in the second direction Dy. The first and the second light sources 61 and 62 may be provided on one light source base material, or three or more light source base materials. The detection device 1 may include one of the first light sources 61 and one of the second light sources 62.

Figure 5:
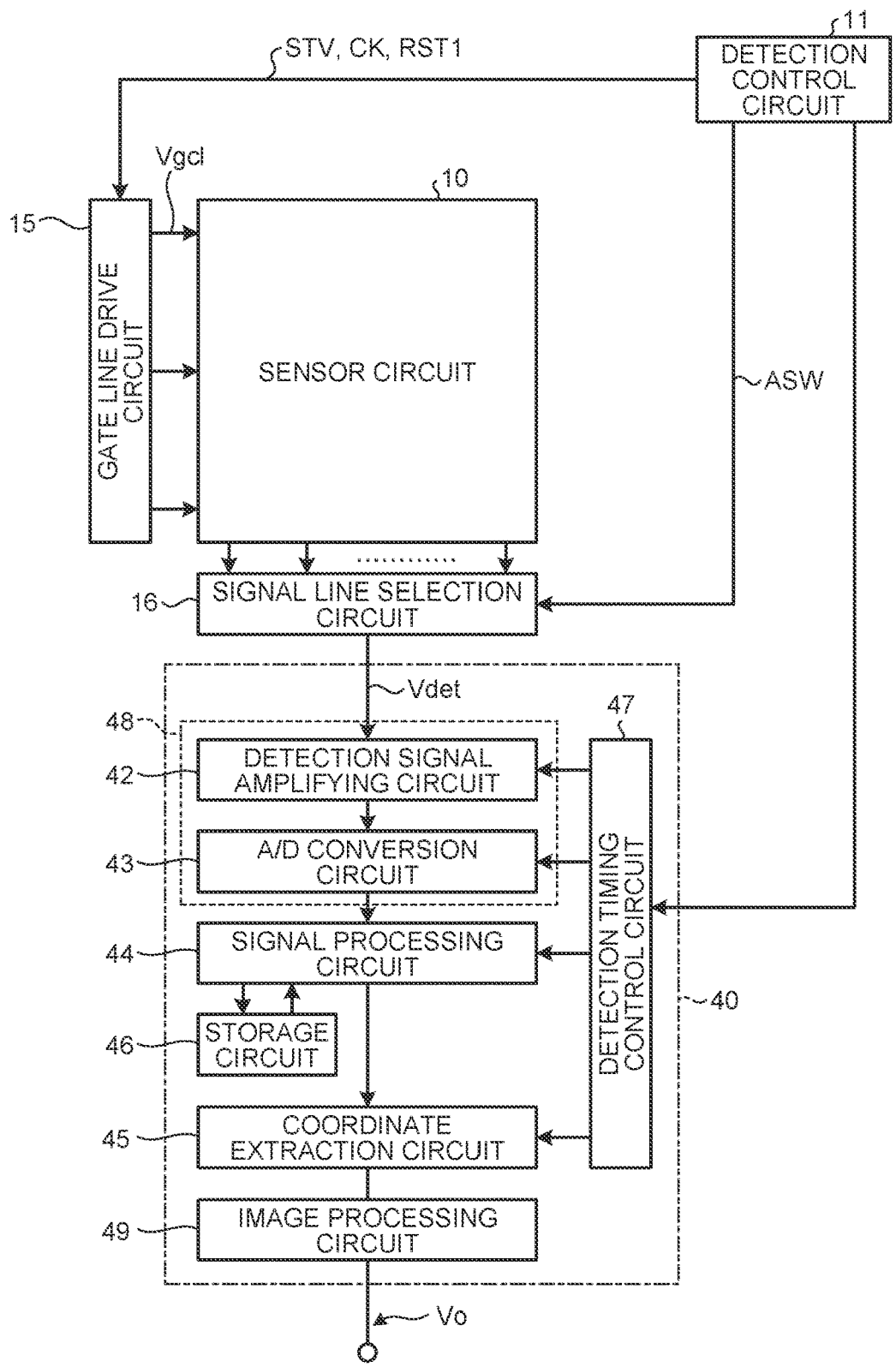
FIG. 5 is a block diagram illustrating a configuration example of the detection device according to the first embodiment.

FIG. 5 is a block diagram illustrating a configuration example of the detection device 1 according to the first embodiment. As illustrated in FIG. 5, the detection device 1 further includes a detection control circuit 11 and a detection circuit 40. The control circuit 122 includes one, some, or all functions of the detection control circuit 11. The control circuit 122 also includes one, some, or all functions of the detection circuit 40 except those of the detection circuit 48.

The optical sensor 10 is an optical sensor that includes the photodiodes PD serving as photoelectric conversion elements. Each of the photodiodes PD included in the optical sensor 10 outputs an electrical signal corresponding to light irradiating the photodiode PD as a detection signal Vdet to the signal line selection circuit 16. The optical sensor 10 performs the detection according to a gate drive signal Vgcl supplied from the gate line drive circuit 15.

The detection control circuit 11 is a circuit that supplies respective control signals to the gate line drive circuit 15, the signal line selection circuit 16, and the detection circuit 40 to control operations of these components. The detection control circuit 11 supplies various control signals including, for example, a start signal STV, a clock signal CK, and a reset signal RST1 to the gate line drive circuit 15. The detection control circuit 11 also supplies various control signals including, for example, a selection signal ASW to the signal line selection circuit 16. The detection control circuit 11 also supplies various control signals to the first and the second light sources 61 and 62 to control the lighting and non-lighting of the respective first and second light sources 61 and 62.

The gate line drive circuit 15 is a circuit that drives a plurality of gate lines GCL (refer to FIG. 6) based on the various control signals. The gate line drive circuit 15 sequentially or simultaneously selects the gate lines GCL, and supplies the gate drive signals Vgcl to the selected gate lines GCL. Through this operation, the gate line drive circuit 15 selects the photodiodes PD coupled to the gate lines GCL.

Figure 7:
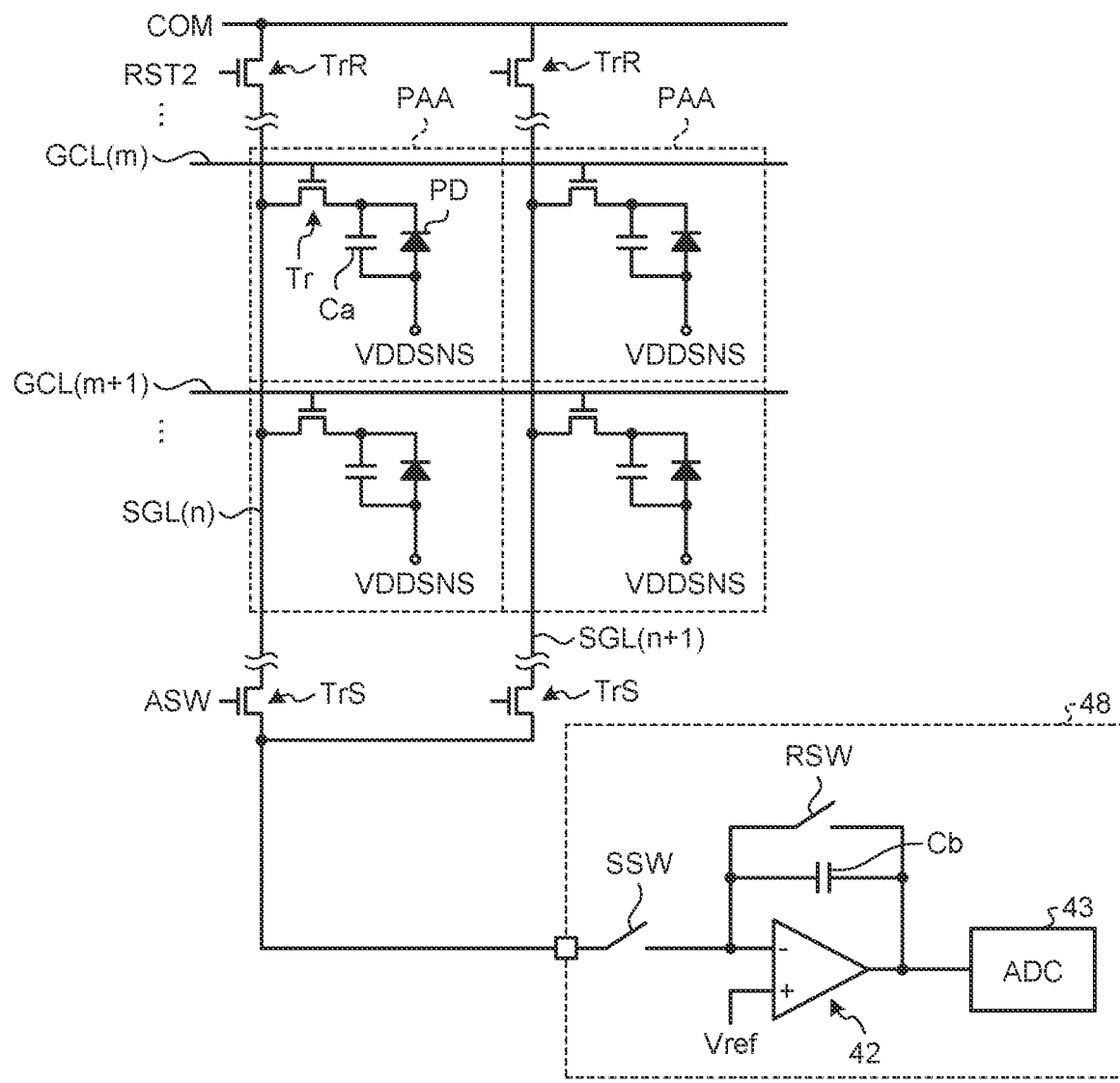
FIG. 7 is a circuit diagram illustrating a plurality of partial detection areas.

The signal line selection circuit 16 is a switch circuit that sequentially or simultaneously selects a plurality of signal lines SGL (refer to FIG. 7). The signal line selection circuit 16 is, for example, a multiplexer. The signal line selection circuit 16 couples the selected signal lines SGL to the detection circuit 48 based on the selection signal ASW supplied from the detection control circuit 11. Through this operation, the signal line selection circuit 16 outputs the detection signal Vdet of the photodiode PD to the detection circuit 40.

The detection circuit 40 includes the detection circuit 48, a signal processing circuit 44, a coordinate extraction circuit 45, a storage circuit 46, a detection timing control circuit 47, and an image processing circuit 49. The detection timing control circuit 47 performs control to cause the detection circuit 48, the signal processing circuit 44, the coordinate extraction circuit 45, and the image processing circuit 49 to operate in synchronization with one another based on a control signal supplied from the detection control circuit 11.

The detection circuit 48 is, for example, an analog front-end (AFE) circuit. The detection circuit 48 is a signal processing circuit having functions of at least a detection signal amplifying circuit 42 and an analog-to-digital (A/D) conversion circuit 43. The detection signal amplifying circuit 42 amplifies the detection signal Vdet. The A/D conversion circuit 43 converts an analog signal output from the detection signal amplifying circuit 42 into a digital signal.

The signal processing circuit 44 is a logic circuit that detects a predetermined physical quantity received by the optical sensor 10 based on output signals of the detection circuit 48. The signal processing circuit 44 can detect asperities on a biological surface of the finger Fg or a palm based on the signals from the detection circuit 48 when the finger Fg is in contact with or in proximity to a detection surface. The signal processing circuit 44 can detect the information on the living body based on the signals from the detection circuit 48. Examples of the information on the living body include the pulsation and the blood oxygen saturation level of the finger Fg.

The signal processing circuit 44 may also perform processing of acquiring the detection signals Vdet (information on the living body) simultaneously detected by the photodiodes PD, and averaging the detection signals Vdet. In this case, the detection circuit 40 can perform stable detection by reducing measurement errors caused by noise and/or relative positional misalignment between the object to be detected, such as the finger Fg, and the optical sensor 10.

The storage circuit 46 temporarily stores therein signals calculated by the signal processing circuit 44. The storage circuit 46 may be, for example, a random-access memory (RAM) or a register circuit.

The coordinate extraction circuit 45 is a logic circuit that obtains detected coordinates of the asperities on the biological surface of the finger or the like when the contact or the proximity of the finger is detected by the signal processing circuit 44. The coordinate extraction circuit 45 is the logic circuit that also obtains detected coordinates of blood vessels of the finger Fg or the palm. The image processing circuit 49 combines the detection signals Vdet output from the respective photodiodes PD of the optical sensor 10 to generate two-dimensional information representing the shape of the asperities on the biological surface of the finger Fg or the like and two-dimensional information representing the shape of the blood vessels of the finger Fg or the palm. The coordinate extraction circuit 45 may output the detection signals Vdet as sensor outputs Vo instead of calculating the detected coordinates. A case can be considered where the detection circuit 40 does not include the coordinate extraction circuit 45 and the image processing circuit 49.

The detection control circuit 11 has a function to compare the detected information on the living body with authentication information stored in advance and authenticate the person to be authenticated based on the result of the comparison. The detection control circuit 11 has a function to control transmission of the detected information on the living body to an external device through a communication device (not illustrated in the drawings).

Figure 6:
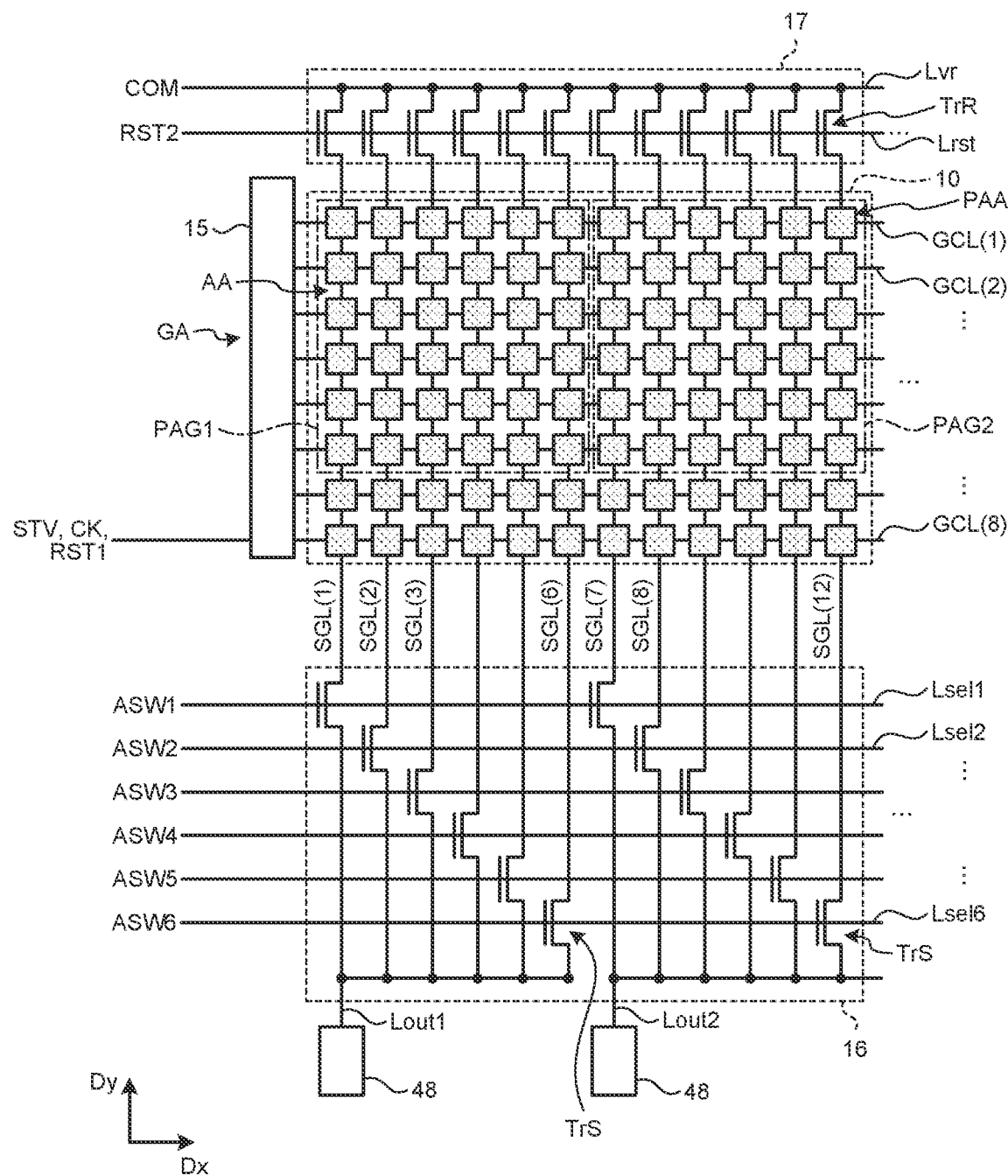
FIG. 6 is a circuit diagram illustrating the detection device.

The following describes a circuit configuration example of the detection device 1. FIG. 6 is a circuit diagram illustrating the detection device 1. FIG. 7 is a circuit diagram illustrating a plurality of partial detection areas. FIG. 7 also illustrates a circuit configuration of the detection circuit 48.

As illustrated in FIG. 6, the optical sensor 10 has a plurality of partial detection areas PAA arranged in a matrix having a row-column configuration. Each of the partial detection areas PAA is provided with the photodiode PD.

The gate lines GCL extend in the first direction Dx, and are each coupled to the partial detection areas PAA arranged in the first direction Dx. A plurality of gate lines GCL(1), GCL(2), . . . , GCL(8) are arranged in the second direction Dy, and are each coupled to the gate line drive circuit 15. In the following description, the gate lines GCL(1), GCL(2), . . . , GCL(8) will each be simply referred to as the gate line GCL when need not be distinguished from one another. For ease of understanding of the description, FIG. 7 illustrates eight of the gate lines GCL. However, this is merely an example, and M (where M is 8 or larger, and is, for example, 256) of the gate lines GCL may be arranged.

The signal lines SGL extend in the second direction Dy, and are each coupled to the photodiodes PD in the partial detection areas PAA arranged in the second direction Dy. A plurality of signal lines SGL(1), SGL(2), . . . , SGL(12) are arranged in the first direction Dx, and are each coupled to the signal line selection circuit 16 and a reset circuit 17. In the following description, the signal lines SGL(1), SGL(2), . . . , SGL(12) will each be simply referred to as the signal line SGL when need not be distinguished from one another.

For ease of understanding of the description, 12 of the signal lines SGL are illustrated. However, this is merely an example, and N (where N is 12 or larger, and is, for example, 252) of the signal lines SGL may be arranged. In FIG. 6, the optical sensor 10 is provided between the signal line selection circuit 16 and the reset circuit 17. The present invention is not limited thereto. The signal line selection circuit 16 and the reset circuit 17 may be coupled to ends of the signal lines SGL in the same direction.

The gate line drive circuit 15 receives various control signals including, for example, the start signal STV, the clock signal CK, and the reset signal RST1 from the control circuit 122 (refer to FIG. 4). The gate line drive circuit 15 sequentially selects the gate lines GCL(1), GCL(2), . . . , GCL(8) in a time-division manner based on the various control signals. The gate line drive circuit 15 supplies the gate drive signal Vgcl to the selected one of the gate lines GCL. This operation supplies the gate drive signal Vgcl to a plurality of first switching elements Tr coupled to the gate line GCL, and corresponding ones of the partial detection areas PAA arranged in the first direction Dx are selected as detection targets.

The gate line drive circuit 15 may perform different driving for each of detection modes including the detection of a fingerprint and the detection of a plurality of different items of the information on the living body (such as the pulsation and the blood oxygen saturation level). For example, the gate line drive circuit 15 may drive more than one of the gate lines GCL in a bundle.

Specifically, the gate line drive circuit 15 simultaneously selects a predetermined number of the gate lines GCL from among the gate lines GCL(1), GCL(2), . . . , GCL(8) based on the control signals. For example, the gate line drive circuit 15 simultaneously selects six gate lines GCL(1) to GCL(6), and supplies thereto the gate drive signals Vgcl. The gate line drive circuit 15 supplies the gate drive signals Vgcl through the selected six gate lines GCL to the first switching elements Tr. Through this operation, detection area groups PAG1 and PAG2 each including more than one of the partial detection areas PAA arranged in the first direction Dx and the second direction Dy are selected as the respective detection targets. The gate line drive circuit 15 drives the predetermined number of the gate lines GCL in a bundle, and sequentially supplies the gate drive signals Vgcl to each unit of the predetermined number of the gate lines GCL.

The signal line selection circuit 16 includes a plurality of selection signal lines Lsel, a plurality of output signal lines Lout, and third switching elements TrS. The third switching elements TrS are provided correspondingly to the respective signal lines SGL. Six signal lines SGL(1), SGL(2), . . . , SGL(6) are coupled to a common output signal line Lout1. Six signal lines SGL(7), SGL(8), . . . , SGL(12) are coupled to a common output signal line Lout2. The output signal lines Lout1 and Lout2 are each coupled to the detection circuit 48.

The signal lines SGL(1), SGL(2), . . . , SGL(6) are grouped into a first signal line block, and the signal lines SGL(7), SGL(8), . . . , SGL(12) are grouped into a second signal line block. The selection signal lines Lsel are coupled to the gates of the respective third switching elements TrS included in one of the signal line blocks. One of the selection signal lines Lsel is coupled to the gates of the third switching elements TrS in the signal line blocks.

Specifically, selection signal lines Lsel1, Lsel2, . . . , Lsel6 are coupled to the third switching elements TrS corresponding to the signal lines SGL(1), SGL(2), . . . , SGL(6), respectively. The selection signal line Lsel1 is coupled to one of the third switching elements TrS corresponding to the signal line SGL(1) and one of the third switching elements TrS corresponding to the signal line SGL(7). The selection signal line Lsel2 is coupled to one of the third switching elements TrS corresponding to the signal line SGL(2) and one of the third switching elements TrS corresponding to the signal line SGL(8).

The control circuit 122 (refer to FIG. 4) sequentially supplies the selection signal ASW to the selection signal lines Lsel. This operation causes the signal line selection circuit 16 to operate the third switching elements TrS to sequentially select the signal lines SGL in one of the signal line blocks in a time-division manner. The signal line selection circuit 16 selects one of the signal lines SGL in each of the signal line blocks. With the above-described configuration, the detection device 1 can reduce the number of integrated circuits (ICs) including the detection circuit 48 or the number of terminals of the ICs.

The signal line selection circuit 16 may couple more than one of the signal lines SGL in a bundle to the detection circuit 48. Specifically, the control circuit 122 (refer to FIG. 4) simultaneously supplies the selection signal ASW to the selection signal lines Lsel. This operation causes the signal line selection circuit 16 to operate the third switching elements TrS to select the signal lines SGL (for example, six of the signal lines SGL) in one of the signal line blocks, and couple the signal lines SGL to the detection circuit 48. As a result, the signals detected in each of the detection area groups PAG1 and PAG2 are output to the detection circuit 48. In this case, the signals from the partial detection areas PAA (photodiodes PD) included in each of the detection area groups PAG1 and PAG2 are put together and output to the detection circuit 48.

Through the operations of the gate line drive circuit 15 and the signal line selection circuit 16, the detection is performed for each of the detection area groups PAG1 and PAG2. As a result, the intensity of the detection signal Vdet obtained by a one-time detection operation increases, so that the sensor sensitivity can be improved. The time required for the detection can also be reduced. As a result, the detection device 1 can repeatedly perform the detection in a short time, and thus, can improve the signal-to-noise ratio (S/N), and can also accurately detect a temporal change in the information on the living body, such as a pulse wave.

As illustrated in FIG. 6, the reset circuit 17 includes a reference signal line Lvr, a reset signal line Lrst, and fourth switching elements TrR. The fourth switching elements TrR are provided correspondingly to the signal lines SGL. The reference signal line Lvr is coupled to either the sources or the drains of the fourth switching elements TrR. The reset signal line Lrst is coupled to the gates of the fourth switching elements TrR.

The control circuit 122 supplies a reset signal RST2 to the reset signal line Lrst. This operation turns on the fourth switching elements TrR to electrically couple the signal lines SGL to the reference signal line Lvr. The power supply circuit 123 supplies a reference signal COM to the reference signal line Lvr. This operation supplies the reference signal COM to a capacitive element Ca (refer to FIG. 7) included in each of the partial detection areas PAA.

As illustrated in FIG. 7, each of the partial detection areas PAA includes the photodiode PD, the capacitive element Ca, and a corresponding one of the first switching elements Tr.

FIG. 7 illustrates two gate lines GCL(m) and GCL(m+1) arranged in the second direction Dy among the gate lines GCL. FIG. 7 also illustrates two signal lines SGL(n) and SGL(n+1) arranged in the first direction Dx among the signal lines SGL. The partial detection area PAA is an area surrounded by the gate lines GCL and the signal lines SGL. Each of the first switching elements Tr is provided corresponding to the photodiode PD. The first switching element Tr is formed using a thin-film transistor, and in this example, formed of an n-channel metal oxide semiconductor (MOS) thin-film transistor (TFT).

The gates of the first switching elements Tr belonging to the partial detection areas PAA arranged in the first direction Dx are coupled to the gate line GCL. The sources of the first switching elements Tr belonging to the partial detection areas PAA arranged in the second direction Dy are coupled to the signal line SGL. The drain of the first switching element Tr is coupled to the cathode of the photodiode PD and the capacitive element Ca.

The anode of the photodiode PD is supplied with the sensor power supply signal VDDSNS from the power supply circuit 123. The signal line SGL and the capacitive element Ca are supplied with the reference signal COM that serves as an initial potential of the signal line SGL and the capacitive element Ca from the power supply circuit 123.

When the partial detection area PAA is irradiated with light, a current corresponding to the amount of the light flows through the photodiode PD. As a result, an electric charge is stored in the capacitive element Ca. After the first switching element Tr is turned on, a current corresponding to the electric charge stored in the capacitive element Ca flows through the signal line SGL. The signal line SGL is coupled to the detection circuit 48 through a corresponding one of the third switching elements TrS of the signal line selection circuit 16. Thus, the detection device 1 can detect a signal corresponding to the amount of the light irradiating the photodiode PD in each of the partial detection areas PAA or signals corresponding to the amounts of the light irradiating the photodiodes PD in each of the detection area groups PAG1 and PAG2.

During a read period, a switch SSW of the detection circuit 48 is turned on, and the detection circuit 48 is coupled to the signal lines SGL. The detection signal amplifying circuit 42 of the detection circuit 48 converts a variation of a current supplied from the signal lines SGL into a variation of a voltage, and amplifies the result. A reference voltage Vref having a fixed potential is supplied to a non-inverting input terminal (+) of the detection signal amplifying circuit 42, and the signal lines SGL are coupled to an inverting input terminal (−) of the detection signal amplifying circuit 42. In the present embodiment, the same signal as the reference signal COM is supplied as the reference voltage Vref. The detection signal amplifying circuit 42 includes a capacitive element Cb and a reset switch RSW. During a reset period, the reset switch RSW is turned on, and the electric charge of the capacitive element Cb is reset.

With the above-described configuration, the detection device 1 including the photodiodes PD can detect the information on the living body, such as a vein pattern, a dermatoglyphic pattern, the blood oxygen saturation level, and the pulsation of the finger Fg, and externally supply the biometric information including the detected information.

Figure 8:
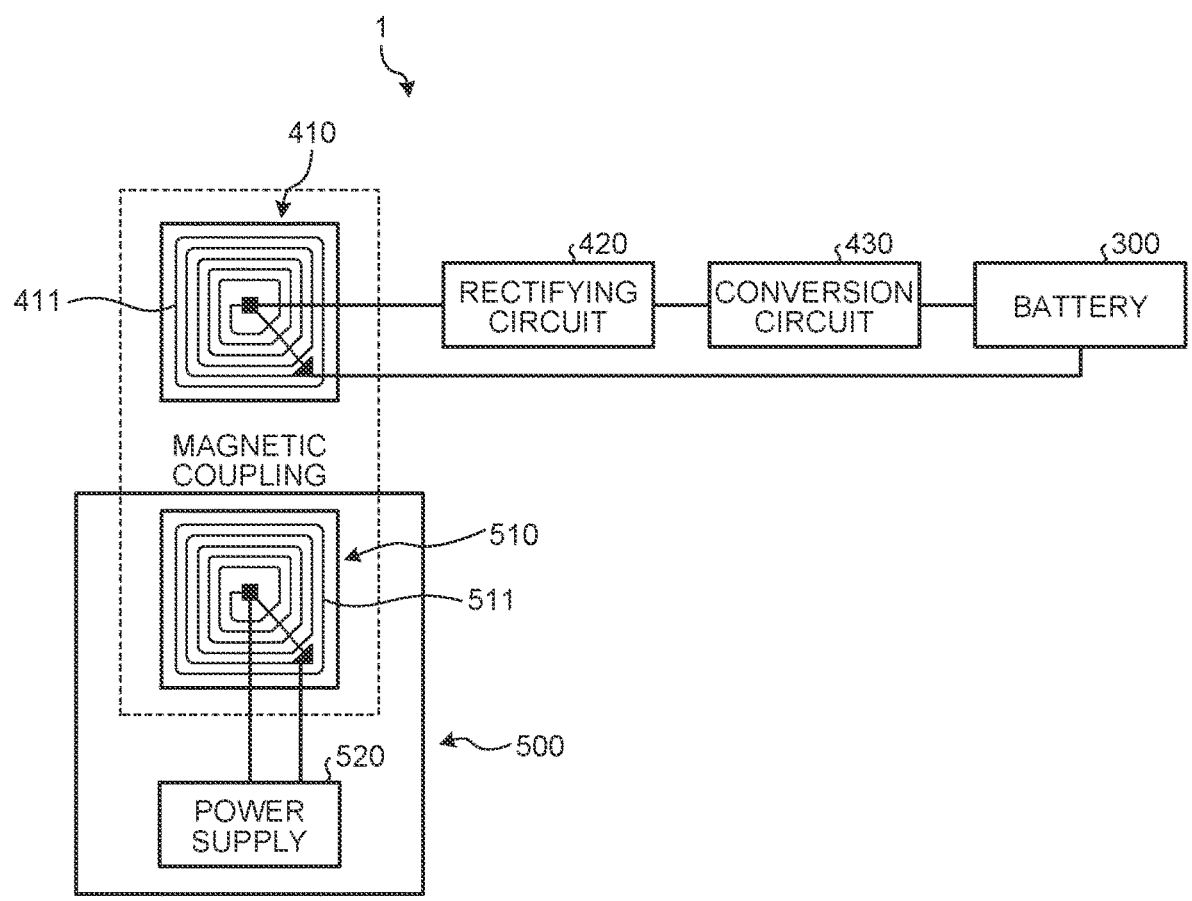
FIG. 8 is a configuration diagram illustrating an exemplary configuration of a power receiving element and a battery.

The following describes the power receiving element 410 and the battery 300. FIG. 8 is a configuration diagram illustrating an exemplary configuration of the power receiving element 410 and the battery 300. As illustrated in FIG. 8, the detection device 1 includes the power receiving element 410, a rectifying circuit 420, and a conversion circuit 430. The power receiving element 410 includes a flat coil 411. The coil 411 is a power receiving coil, and is electrically coupled to the rectifying circuit 420. The coil 411 is located closer to the outer peripheral surface 220 in the first area 230 of the housing 200. When the coil 411 is located proximate to a power transmission coil 511 of the power supply device 500, the coil 411 is magnetically coupled to the power transmission coil 511, receives an electromagnetic field from the power transmission coil 511, and converts the electromagnetic field into an electric current. The coil 411 may be shared with a near-field communication (NFC) antenna, and capture spatial electromagnetic waves to absorb energy.

The power supply device 500 includes a power supply element 510 capable of supplying power to the wireless power receiving element 410 of the detection device 1, and a power supply (a power supply circuit) 520 capable of supplying the power to the power supply element 510. The power supply element 510 includes the power transmission coil 511 for transmitting power to charge the battery 300. The power transmission coil 511 is electrically coupled to the power supply 520. The power transmission coil 511 is a resonant coil, and is operated by a drive voltage from the power supply 520. The power supply 520 is an alternating-current power supply circuit. The power supply device 500 is a device that wirelessly supplies power by magnetically coupling the power transmission coil 511 to the proximate power receiving element 410 on the power receiving side.

The coil 411 of the detection device 1 is electrically coupled to the rectifying circuit 420. The rectifying circuit 420 is, for example, a rectifying circuit that rectifies the current received by the coil 411. The rectifying circuit 420 is electrically coupled to the conversion circuit 430. The conversion circuit 430 is electrically coupled to the battery 300, and converts the current rectified by the rectifying circuit 420 into a direct electric current. When an alternating electric current flows in the power transmission coil 511 on the power transmission side, an alternating magnetic field is generated in the power transmission coil 511, and the alternating magnetic field generates an alternating electric current in the proximate coil 411 in the detection device 1. The detection device 1 converts the generated alternating electric current into the direct electric current, and charges the battery 300. Thus, the detection device 1 is magnetically coupled to establish the wireless power supply.

The battery 300 is a secondary battery. The battery 300 is a chemical battery that can be used while repeatedly charged and discharged. Examples of the battery 300 include storage batteries and rechargeable batteries. The battery 300 is compatible with, for example, Qi (international standard for wireless power supply). The battery 300 can supply stored power to, for example, parts in a detection device 30 that require power. The battery 300 is electrically coupled to the light sources 60 and the optical sensor 10, and supplies the power to the light sources 60, the optical sensor 10, and other parts.

Figure 9:
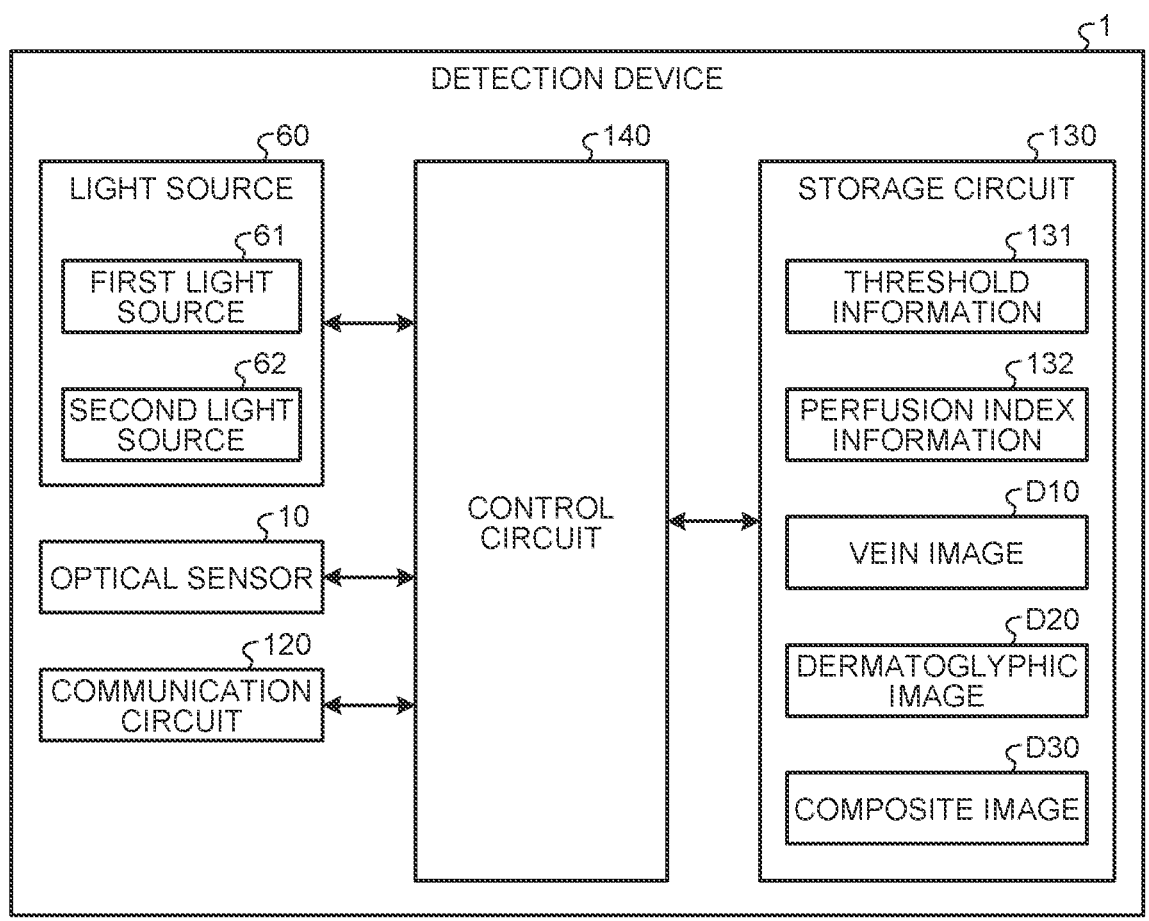
FIG. 9 is a configuration diagram illustrating an exemplary functional configuration of the detection device according to the first embodiment.

The following describes a functional configuration of the detection device 1. FIG. 9 is a configuration diagram illustrating an example of the functional configuration of the detection device 1 according to the first embodiment. As illustrated in FIG. 9, the detection device 1 includes the optical sensor 10 described above, the light sources 60 described above, a communication circuit 120, a storage circuit 130, and a control circuit 140. The control circuit 140 is electrically coupled to the optical sensor the light sources 60, the communication circuit 120, and the storage circuit 130. The control circuit 140 includes, for example, the detection control circuit 11 and the detection circuit 40 described above.

The optical sensor 10 has the partial detection areas PAA arranged in a matrix having a row-column configuration in the detection area AA, and is provided with the photodiode PD in each of the partial detection areas PAA. The optical sensor 10 supplies detection information that allows identification of the amounts of the light received by the photodiodes PD to the control circuit 140. The detection information includes, for example, information where the amounts of the light received by the photodiodes PD represent an image in the detection area AA.

The light sources 60 include the first light sources 61 and the second light sources 62. The light sources 60 are provided on the inner peripheral surface 210 side of the housing 200 facing the optical sensor 10 with the finger Fg interposed therebetween. In the light sources the first light sources 61 that emit the near-infrared light and the second light sources 62 that emit the red light are alternately arranged, and are alternately lit up by the control of the control circuit 140. The light sources 60 may be arranged only for the near-infrared light, and a perfusion index may be measured using only the near-infrared light.

The communication circuit 120 communicates wirelessly. The communication circuit 120 supports wireless communication standards. Examples of the communication standards include cellular phone communication standards, such as the third generation (3G), the fourth generation (4G), and the fifth generation (5G) standards, and short-range wireless communication standards. The communication circuit 120 supplies received information to the control circuit 140. The communication circuit 120 transmits various types of information requested to be transmitted by the control circuit 140 to a destination.

The storage circuit 130 stores therein computer programs and data. The storage circuit 130 temporarily stores therein processing results of the control circuit 140. The storage circuit 130 includes storage media. The storage media include, for example, a read-only memory (ROM), a random-access memory (RAM), a memory card, an optical disc, and/or a magneto-optical disk. The storage circuit 130 stores therein information allowing identification of, for example, detection results detected by the optical sensor 10.

The storage circuit 130 stores therein, for example, threshold information 131, perfusion index information 132, a vein image D10, a dermatoglyphic image D20, and a composite image D30. The threshold information 131 includes information such as a determination threshold for determining whether an acquired image is the vein image D10 or the dermatoglyphic image D20 based on the perfusion index. The determination threshold is an example of a predetermined value. The perfusion index is a ratio of alternating-current (AC) component/direct-current (DC) component obtained from photoresponsive pulse waves acquired by alternately lighting the first and the second light sources 61 and 62 with the finger Fg interposed between the light sources and the optical sensor 10. The blood oxygen saturation level can be obtained from the red/near-infrared ratio of the perfusion index. The perfusion index information 132 is information indicating the perfusion index calculated by the control circuit 140. The vein image D10 is image data allowing identification of the vein pattern of the finger Fg (living body) inserted into the through-hole of the housing 200, and is image data corresponding to the detection area AA. The dermatoglyphic image D20 is image data allowing identification of the dermatoglyphic pattern, and is image data corresponding to the detection area AA. The dermatoglyphic pattern is a pattern formed by dermal ridges seen on the finger Fg, the palm, and the like. In the present embodiment, the dermatoglyphic image D20 is image data indicating the patterns and striations on the biological surface of the finger Fg. The composite image D30 is image data obtained by synthesizing (mapping) the vein image D10 and the dermatoglyphic image D20. The vein image D10, the dermatoglyphic image D20, and the composite image D30 are examples of the image data.

The control circuit 140 includes, for example, a microcontrol unit (MCU) and a central processing unit (CPU). The control circuit 140 integrally controls the operation of the detection device 1. The control circuit 140 has, for example, a function to control the lighting of the light sources 60, a function to acquire images detected by the optical sensor 10, and a function to determine the acquire images. The various functions of the control circuit 140 are performed by executing the computer programs.

The control circuit 140 measures the perfusion index of the finger Fg based on the image data acquired by the optical sensor 10 when the near-infrared light irradiates the optical sensor 10. The control circuit 140 determines the image data to be the vein image D10 when the measured perfusion index is equal to or higher than the determination threshold (predetermined value), and determines the image to be the dermatoglyphic image D20 of the biological surface when the perfusion index is lower than the determination threshold. The control circuit 140 stores the determined image in the storage circuit 130 so as to be associated with the determination results. The control circuit 140 maps the vein image D10 and the dermatoglyphic image D20 to create the composite image D30. The control circuit 140 stores the created composite image D30 in the storage circuit 130. The control circuit 140 provides at least one of the vein image D10, the dermatoglyphic image D20, and the composite image D30 to an external device through the communication circuit 120.

The functional configuration example of the detection device 1 according to the present embodiment has been described above. The configuration described above using FIGS. 1 to 9 is merely an example, which does not limit the functional configuration of the detection device 1 according to the present embodiment. The functional configuration of the detection device 1 according to the present embodiment can be flexibly modified according to specifications and operations.

Examples of States of Finger when Detection Device is Worn

Figure 10:
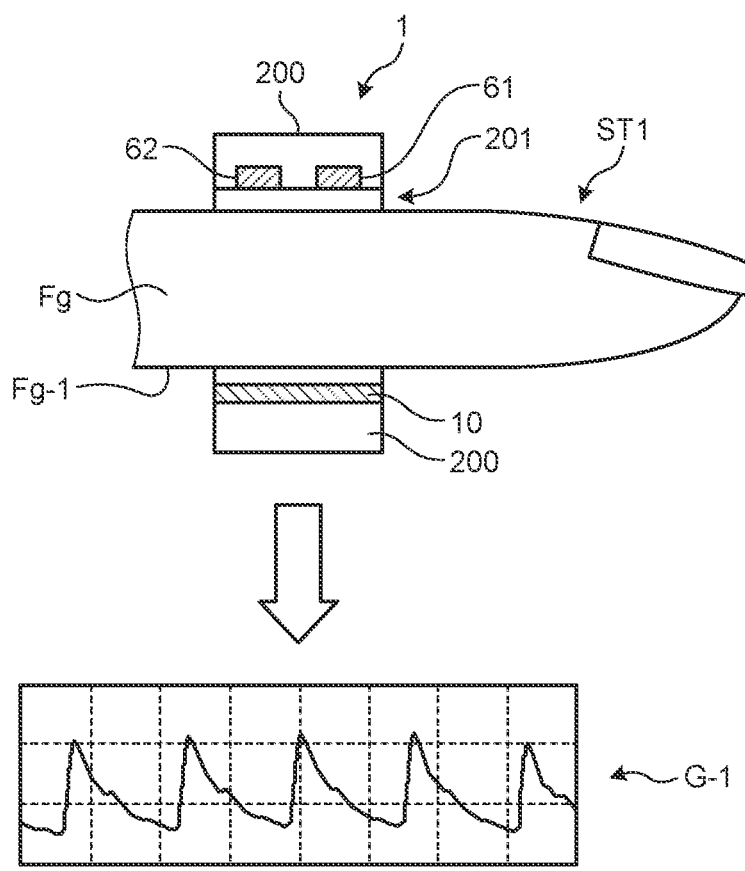
FIG. 10 is a diagram for explaining a detection example of the detection device when the finger is in a stretched state.
Figure 11:
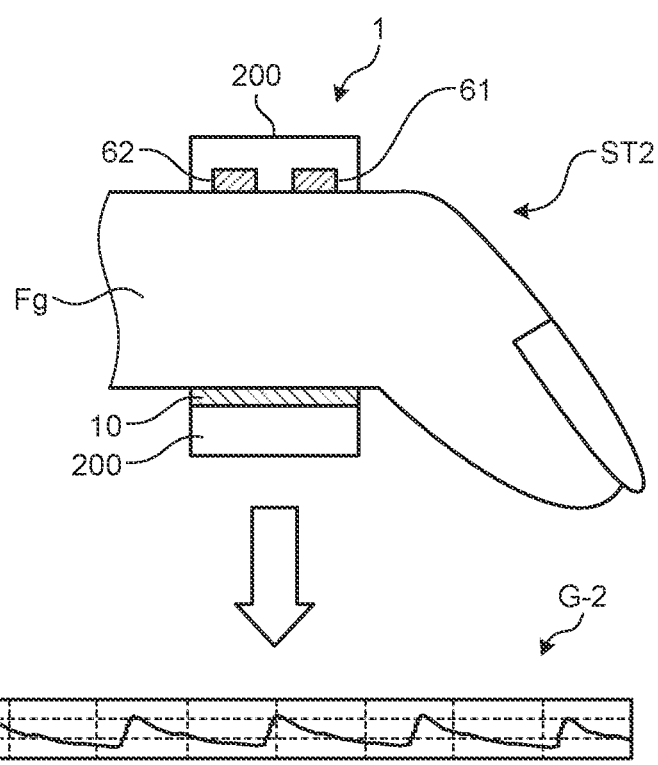
FIG. 11 is a diagram for explaining a detection example of the detection device when the finger is in a bent state.

The following describes examples of states when the detection device 1 is worn on the finger Fg. FIG. 10 is a diagram for explaining a detection example of the detection device 1 when the finger Fg is in a stretched state. FIG. 11 is a diagram for explaining a detection example of the detection device 1 when the finger Fg is in a bent state.

A stretched state ST1 of the finger Fg is a state where the finger Fg is stretched as illustrated in FIG. 10. A bent state ST2 of the finger Fg is a state where the finger Fg is bent by 45 degrees or larger as illustrated in FIG. 11. The inventor of the present application has created the detection device 1 of the present embodiment by discovering the following phenomena.

First, the finger Fg is placed in a state where the blood flows to the fingertip when the finger Fg is in the stretched state ST1, and placed in a state where the blood flow is blocked when the finger Fg is in the bent state ST2. It was found that, when the blood flow in the finger Fg is blocked in the bent state ST2, the pulse wave component (amplitude) decreases in the image, and the image of the finger Fg is obtained on which the dermatoglyphic pattern can be identified. Experiments have clarified that, when the blood flow in the finger Fg is blocked, the perfusion index serving as the ratio of AC component/DC component of the optical sensor 10 obtained from the pulse waves decreases. That is, when the finger Fg is in the stretched state ST1, the detection device 1 can detect the pulse waves illustrated in graph G-1 in FIG. 10 with the optical sensor 10 by alternately lighting the first and the second light sources 61 and 62. When the finger Fg is in the bent state ST2, the detection device 1 can detect the pulse waves illustrated in graph G-2 in FIG. 11 with the optical sensor 10 by alternately lighting the first and the second light sources 61 and 62. Graph G-2 illustrates a smaller waveform than that of graph G-1. Therefore, the detection device 1 has a function to determine whether the finger Fg is in the stretched state ST1 or the bent state ST2 according to the magnitude of the perfusion index by calculating the perfusion index from the detected pulse waves. Thus, when the finger Fg is in the stretched state ST1, the blood flows in the finger FG. Therefore, the detection device 1 can obtain the image of the finger Fg in which the veins can be identified. When the finger Fg is in the bent state ST2, the blood flow in the finger FG is blocked. Therefore, the detection device 1 can obtain the image of the finger Fg on which the dermatoglyphic pattern can be identified. The first and the second light sources 61 and 62 may be arranged only for the near-infrared light, and the perfusion index may be measured using only the near-infrared light.

When measuring an arterial blood oxygen saturation level, the perfusion index is preferably equal to or higher than 1.0%. The average value of the perfusion index at the fingertip is said to be approximately from 2.0% to 10%, and varies depending on also the volume and the circulatory state of the blood. If the perfusion index is lower than 1.0%, the condition of the peripheral blood flow is worse than normal. That is, if the perfusion index is lower than 1.0%, the finger Fg is in the bent state ST2. In the present embodiment, in the detection device 1, the determination threshold for the perfusion index is set to 1.0% in the threshold information 131, but is not limited to this value. The determination threshold for the perfusion index can be set to a threshold obtained by, for example, machine learning or experiments, and can be set to a value of from 1.0% to 50%.

In the detection device 1, the inside diameter of a through-hole 201 of the housing 200 is larger than the diameter (size) of the finger Fg by several millimeters so as to allow the finger Fg wearing the housing 200 to be switched between the stretched state ST1 and the bent state ST2. The detection device 1 is preferably placed in a state of having a gap between the finger Fg and the housing 200 when the finger Fg is in the stretched state ST1, as illustrated in FIG. 10. The detection device 1 is preferably placed in a state where the finger Fg contacts the housing 200 when the finger Fg is in the bent state ST2, as illustrated in FIG. 11.

Figure 12:
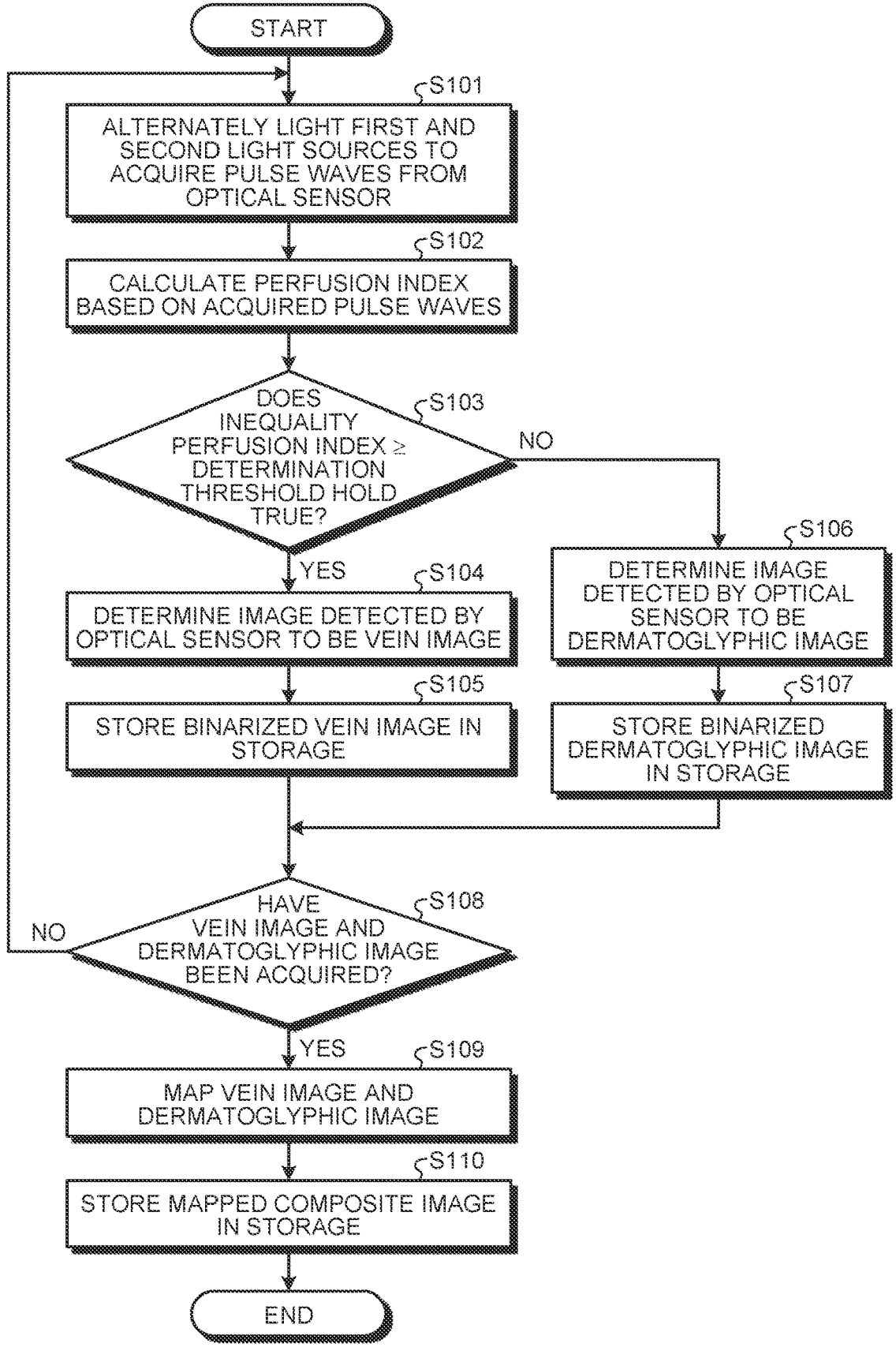
FIG. 12 is a flowchart illustrating an exemplary processing procedure performed by the detection device according to the first embodiment.
Figure 13:
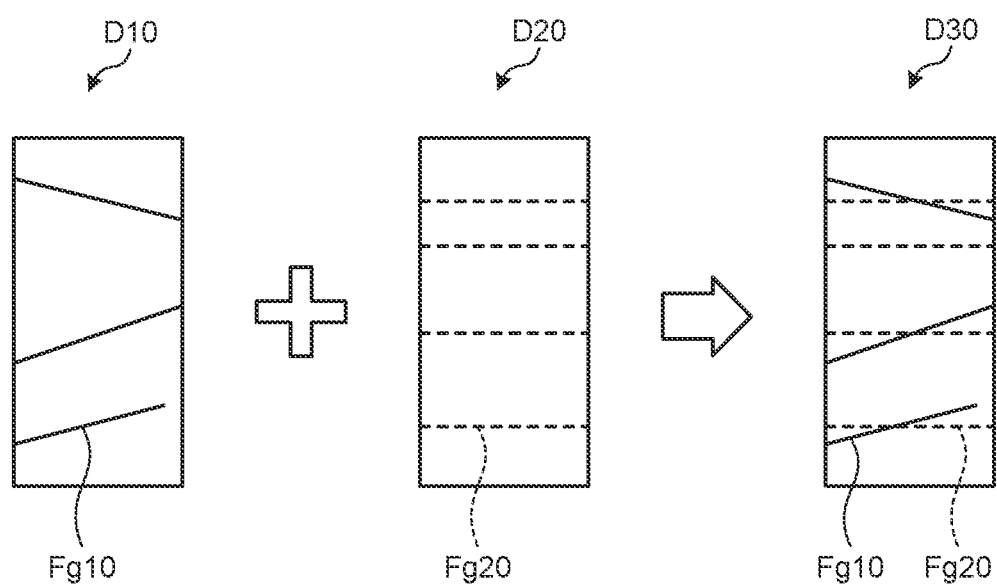
FIG. 13 is a diagram for explaining an exemplary composite image of a vein image and a dermatoglyphic image.

Example of Processing Procedure of Detection Device According to First Embodiment The following describes a processing procedure of the detection device 1 worn on the finger Fg. FIG. 12 is a flowchart illustrating an example of the processing procedure performed by the detection device 1 according to the first embodiment. FIG. 13 is a diagram for explaining an example of the composite image D30 of the vein image D10 and the dermatoglyphic image D20. The processing procedure illustrated in FIG. 12 is implemented by execution of a computer program by the control circuit 140 of the detection device 1. The detection device 1, for example, repeatedly executes the processing procedure illustrated in FIG. 12 at detection timing when the detection device 1 is worn on the finger Fg. Examples of the detection timing includes the time of authentication, the date and time and the period of time set in advance, and the time when the detection device 1 is worn on the finger Fg. The person to be authenticated is assumed to change the state of the finger Fg between the stretched state ST1 and the bent state ST2 at the detection timing.

As illustrated in FIG. 12, the detection device 1 alternately lights the first and the second light sources 61 and 62 to acquire pulse waves from the optical sensor 10 (Step S101). For example, the detection device 1 acquires the AC and DC components of the pulse waves when the first and the second light sources 61 and 62 are alternately lit. After ending the process at Step S101, the detection device 1 performs processing at Step S102.

The detection device 1 calculates the perfusion index based on the acquired pulse waves (Step S102). For example, the detection device 1 calculates the ratio of AC component/DC component of the acquired pulse waves, and stores the calculated result as the perfusion index in the perfusion index information 132 of the storage circuit 130. After ending the process at Step S102, the detection device 1 performs processing at Step S103.

The detection device 1 determines whether the perfusion index is equal to or higher than the determination threshold (Step S103). For example, the detection device 1 compares the perfusion index with the determination threshold of the threshold information 131, and makes the determination based on the comparison result. If the perfusion index is determined to be equal to or higher than the determination threshold (Yes at Step S103), the detection device 1 considers the finger Fg to be in the stretched state ST1, and performs processing at Step S104.

The detection device 1 determines the image detected by the optical sensor 10 to be the vein image D10 (Step S104). For example, the detection device 1 determines an image representing two-dimensional information generated by the image processing circuit 49 by combining the detection signals Vdet output from the photodiodes PD of the optical sensor 10 to be the vein image D10. The detection device 1 then stores the binarized vein image D10 in the storage circuit 130 (Step S105). Thus, the detection device 1 can store the vein image D10 allowing identification of detected veins Fg10 in the storage circuit 130, as illustrated in FIG. 13. Referring back to FIG. 12, after ending the process at Step S105, the detection device 1 performs processing at Step S108 (to be described later).

If the perfusion index is determined to be not equal to or higher than the determination threshold, that is, the perfusion index is determined to be lower than the determination threshold (No at Step S103), the detection device 1 considers the finger Fg to be in the bent state ST2, and performs processing at Step S106. The detection device 1 determines the image detected by the optical sensor 10 to be the dermatoglyphic image D20 (Step S106). For example, the detection device 1 determines the image representing the two-dimensional information generated by the image processing circuit 49 by combining the detection signals Vdet output from the photodiodes PD of the optical sensor 10 to be the dermatoglyphic image D20. The detection device 1 then stores the binarized dermatoglyphic image D20 in the storage circuit 130 (Step S107). Thus, the detection device 1 can store the dermatoglyphic image D20 allowing identification of a detected dermatoglyphic pattern Fg20 in the storage circuit 130, as illustrated in FIG. 13. Referring back to FIG. 12, after ending the process at Step S107, the detection device 1 performs the processing at Step S108.

The detection device 1 determines whether the vein image D10 and the dermatoglyphic image D20 have been acquired (Step S108). For example, the detection device 1 determines that the vein image D10 and the dermatoglyphic image D20 have been acquired if the vein image D10 and dermatoglyphic image D20 associable with each other are stored in the storage circuit 130. If the detection device 1 determines that the vein image D10 and the dermatoglyphic image D20 have not been acquired (No at Step S108), the detection device 1 returns the process to Step S101 already described in order to acquire lacking images, and continues the processing. If the detection device 1 determines that the vein image D10 and the dermatoglyphic image D20 have been acquired (Yes at Step S108), the detection device 1 performs processing at Step S109.

The detection device 1 maps the vein image D10 and the dermatoglyphic image D20 (Step S109). For example, the detection device 1 performs an operation to associate the veins FG10 represented by the vein image D10 with the dermatoglyphic pattern Fg20 represented by the dermatoglyphic image D20 in the detection area AA. The detection device 1 then stores the mapped composite image D30 in the storage circuit 130 (Step S110). For example, the detection device 1 stores the composite image D30 in the storage circuit 130 so as to be associated with the vein image D10 and the dermatoglyphic image D20. Thus, the detection device 1 can store the composite image D30 allowing identification of the veins Fg10 and the dermatoglyphic pattern Fg20 in the storage circuit 130, as illustrated in FIG. 13. Referring back to FIG. 12, after ending the process at Step S110, the detection device 1 ends the processing procedure illustrated in FIG. 12.

The processing procedure illustrated in FIG. 12 includes the processes that binarize the images at Steps S105 and S107, but the processing procedure is not limited to including these processes. The processes at Steps S105 and S107 in the processing procedure illustrated in FIG. 12 may be modified so as to store the images in the storage circuit 130 without performing the binarization.

As described above, the detection device 1 measures the perfusion index of the blood flow based on the image acquired by the optical sensor 10 when being irradiated with the near-infrared light, and determines the image to be the vein image D10 when the perfusion index is equal to or higher than the determination threshold, and determines the image to be the dermatoglyphic image D20 when the perfusion index is lower than the determination threshold. Thus, the detection device 1 can detect the vein image D10 and the dermatoglyphic image D20 so as to be distinguished from each other by simply changing the state of the finger Fg while the detection device 1 is worn on the finger Fg. As a result, the detection device 1 having the ring-shaped (finger ring-shaped) housing 200 is reduced in size and weight, and thereby can be worn all the time, and can detect a plurality of types of images. The detection device 1 can detect the multiple of types of images related to the living body by simply changing the state of the finger Fg between the stretched state ST1 and the bent state ST2, and therefore, does not bother the person to be authenticated. Since the relation between the vein image D10 and the dermatoglyphic image D20 differs between individuals in mapping examples, the detection device 1 can identify the individuals from the positional relation between the vein image D10 and the dermatoglyphic image D20 even if the signals are unclear.

The detection device 1 further includes the second light sources 62 that emit the red light. The detection device 1 measures the perfusion index based on the image detected by the optical sensor 10 when the control circuit 140 alternately irradiates the optical sensor 10 with the red light and the near-infrared light, and determines the image to be the vein image D10 when the perfusion index is equal to or higher than the determination threshold, and determines the image to be the dermatoglyphic image D20 of the biological surface when the perfusion index is lower than the determination threshold. As a result, the detection device 1 can acquire the images according to the irradiation by the red light and the near-infrared light, and thereby can detect the different images, and obtain the blood oxygen saturation level from the ratio between the near-infrared and the red light.

In addition, the detection device 1 can be wirelessly charged in the worn state. Therefore, even if the detected images, for example, are transmitted to an external device, the battery 300 can be restrained from running out of power. As a result, the housing 200 of the detection device 1 can be worn over a long time, and thus the convenience can be improved.

Second Embodiment

Figure 14:
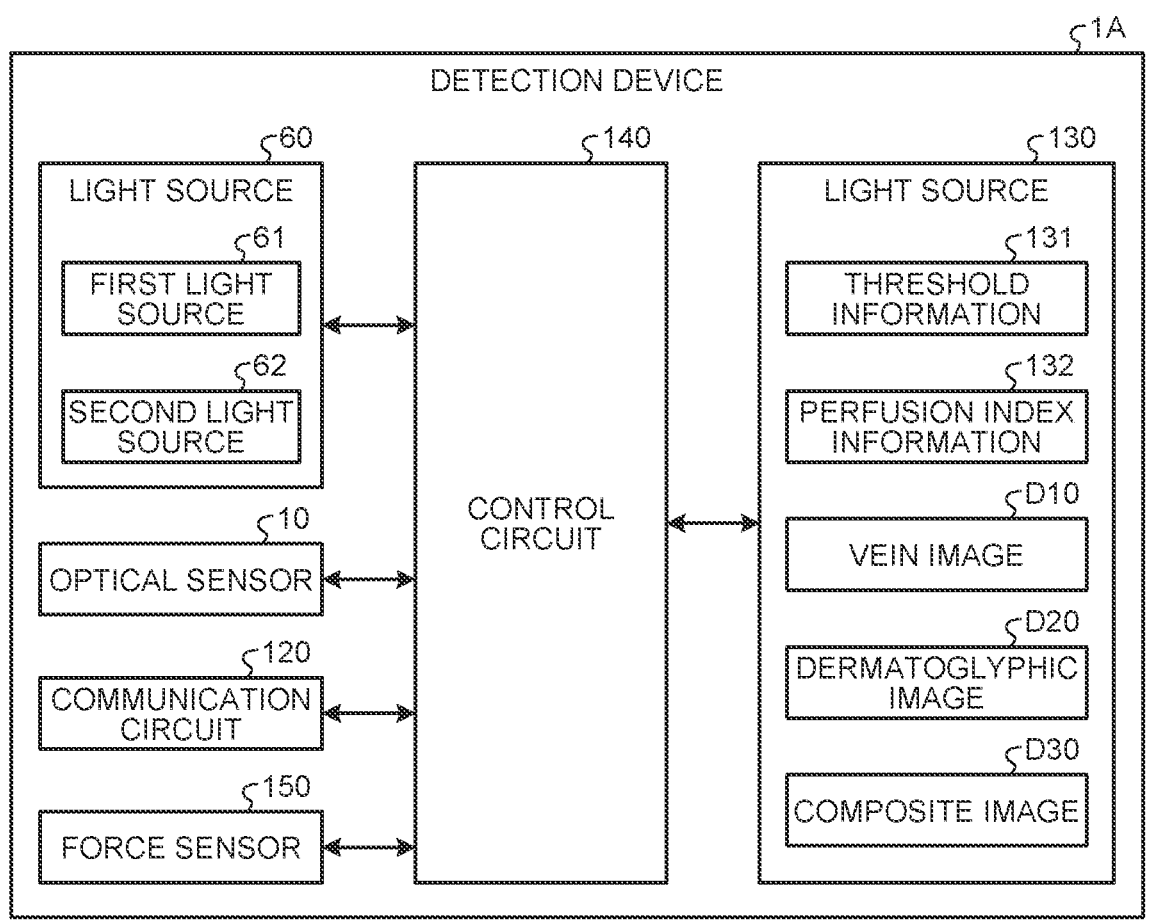
FIG. 14 is a configuration diagram illustrating an exemplary functional configuration of a detection device according to a second embodiment.
Figure 15:
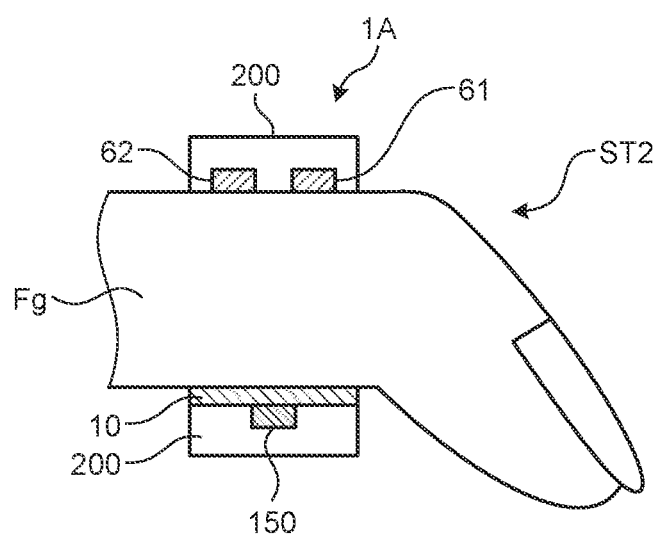
FIG. 15 is a schematic sectional view of the detection device according to the second embodiment.

The following describes a functional configuration of a detection device 1A according to a second embodiment. FIG. 14 is a configuration diagram illustrating an example of the functional configuration of the detection device 1A according to the second embodiment. FIG. 15 is a schematic sectional view of the detection device 1A according to the second embodiment.

As illustrated in FIG. 14, the detection device 1A includes the optical sensor 10, the light sources 60, the communication circuit 120, the storage circuit 130, and the control circuit 140 that are described above, and a force sensor 150. That is, the detection device 1A has a configuration obtained by adding the force sensor 150 to the detection device 1 according to first embodiment. The force sensor 150 is electrically coupled to the control circuit 140. Since the detection device 1A has the same basic configuration as that of the detection device 1, the following describes only differences from the detection device 1.

The force sensor 150 is provided in the housing 200 so that the finger Fg wearing the housing 200 contacts the optical sensor 10 at least in the bent state ST2, as illustrated in FIG. 15. In the present embodiment, the detection device 1A will be described for a case where the force sensor 150 is provided near the optical sensor 10 of the housing 200 contacted by the finger pulp Fg-1 of the finger Fg, but the present embodiment is not limited to this case. The detection device 1A may be provided with the force sensor 150 at a place contacted by the finger Fg in the bent state ST2, or may be provided with the force sensor 150 at a place where the value of the force changes between the stretched state ST1 and the bent state ST2 of the finger Fg. The force sensor 150 supplies force information indicating the force corresponding to the state of contact with the finger Fg to the control circuit 140. When the finger Fg in the bent state ST2 is in contact, the force changes to a value larger than that when the finger Fg is in the stretched state ST1. The force sensor 150 may be, for example, a force switch made of a sensor and an electronic switch.

Referring back to FIG. 14, the threshold information 131 in the storage circuit 130 includes information such as a force threshold for determining whether the finger Fg is in the stretched state ST1 or the bent state ST2. The force threshold may be set to a value obtained by, for example, calibration using the finger Fg wearing the housing 200, or to a value obtained according to the size of the finger Fg using, for example, the machine learning or simulation. The force threshold is such that, for example, the finger Fg is in the stretched state ST1 when the force is equal to or lower than the force threshold, and the finger Fg is in the bent state ST2 when the force is higher than the force threshold.

When the near-infrared light is emitted, the control circuit 140 determines the image to be the vein image D10 when the value of the force of the force sensor 150 is equal to or lower than the force threshold, and determines the image to be the dermatoglyphic image D20 of the biological surface when the value of the force is higher than the force threshold. The control circuit 140 stores the determined images in the storage circuit 130 so as to be associated with the determination results, the force information, and other information.

The functional configuration example of the detection device 1A according to the present embodiment has been described above. The configuration described above using FIGS. 14 and 15 is merely an example, which does not limit the functional configuration of the detection device 1A according to the present embodiment. The functional configuration of the detection device 1A according to the present embodiment can be flexibly modified according to specifications and operations.

Example of Processing Procedure of Detection Device According to Second Embodiment The following describes a processing procedure of the detection device 1A worn on the finger Fg. FIG. 16 is a flowchart illustrating an example of the processing procedure performed by the detection device 1A according to the second embodiment. The processing procedure illustrated in FIG. 16 is implemented by execution of a computer program by the control circuit 140 of the detection device 1A. The detection device 1A, for example, repeatedly executes the processing procedure illustrated in FIG. 16 at the detection timing when the detection device 1A is worn on the finger Fg. The processing procedure at Step S101 and Steps S104 to S110 is the same as that at Step S101 and Steps S104 to S110 illustrated in FIG. 12, and therefore, will be briefly described.

As illustrated in FIG. 16, the detection device 1A alternately lights the first and the second light sources 61 and 62 to acquire pulse waves from the optical sensor 10 (Step S101). The detection device 1A may light up only the infrared light. After ending the process at Step S101, the detection device 1A performs processing at Step S111.

The detection device 1A acquires the force information from the force sensor 150 (Step S111). The detection device 1A then determines whether the value (force) of the force sensor 150 is equal to or lower than the force threshold (Step S112). For example, the detection device 1A compares the value of the force with the force threshold in the threshold information 131, and makes the determination based on the comparison result. If the value of the force sensor 150 is determined to be equal to or lower than the force threshold (Yes at Step S112), the detection device 1A considers the finger Fg to be in the stretched state ST1, and performs processing at Step S104.

The detection device 1A determines the image detected by the optical sensor 10 to be the vein image D10 (Step S104). The detection device 1A then stores the binarized vein image D10 in the storage circuit 130 (Step S105). Thus, the detection device 1A can store the vein image D10 allowing the identification of the detected veins Fg10 in the storage circuit 130. After ending the process at Step S105, the detection device 1A performs the process at Step S108 (to be described later).

If the value of the force sensor 150 is determined to be not equal to or lower than the force threshold, that is, the value of the force sensor 150 is determined to be higher than the force threshold (No at Step S112), the detection device 1A considers the finger Fg to be in the bent state ST2, and performs processing at Step S106. The detection device 1A determines the image detected by the optical sensor 10 to be the dermatoglyphic image D20 (Step S106). The detection device 1A then stores the binarized dermatoglyphic image D20 in the storage circuit 130 (Step S107). Thus, the detection device 1A can store the dermatoglyphic image D20 allowing the identification of the detected dermatoglyphic pattern Fg20 in the storage circuit 130. After ending the process at Step S107, the detection device 1A performs the process at Step S108.

The detection device 1A determines whether the vein image D10 and the dermatoglyphic image D20 have been acquired (Step S108). If the detection device 1A determines that the vein image D10 and the dermatoglyphic image D20 have not been acquired (No at Step S108), the detection device 1A returns the process to Step S101 already described in order to acquire lacking images, and continues the processing. If the detection device 1A determines that the vein image D10 and the dermatoglyphic image D20 have been acquired (Yes at Step S108), the detection device 1A performs the process at Step S109.

The detection device 1A maps the vein image D10 and the dermatoglyphic image D20 (Step S109). The detection device 1A then stores the mapped composite image D30 in the storage circuit 130 (Step S110). Thus, the detection device 1A can store the composite image D30 allowing the identification of the veins Fg10 and the dermatoglyphic pattern Fg20 in the storage circuit 130. After ending the process at Step S110, the detection device 1A ends the processing procedure illustrated in FIG. 16.

As described above, the detection device 1A determines the image acquired by the optical sensor 10 when being irradiated with the near-infrared light to be the vein image D10 when the value of the force of the force sensor 150 is equal to or lower than the force threshold, and determines the image to be the dermatoglyphic image D20 when the value of the force is higher than the force threshold. Thus, the detection device 1A can detect the vein image D10 and the dermatoglyphic image D20 so as to be distinguished from each other by simply changing the state of the finger Fg while the detection device 1A is worn on the finger Fg. In addition, the detection device 1A can be wirelessly charged in the worn state. Therefore, even if the detected images, for example, are transmitted to an external device, the battery 300 can be restrained from running out of power. As a result, the detection device 1A can be worn all the time, and can detect a plurality of types of images. The detection device 1A can detect the multiple of types of images related to the living body by simply changing the state of the finger Fg between the stretched state ST1 and the bent state ST2, and therefore, does not bother the person to be authenticated. Since the relation between the vein image D10 and the dermatoglyphic image D20 differs between individuals in mapping examples, the detection device 1A can identify the individuals from the positional relation between the vein image D10 and the dermatoglyphic image D20 even if the signals are unclear.

The detection device 1A can also determine the stretched state ST1 and the bent state ST2 of the finger Fg by combining the above-described perfusion index and the value of the force. For example, when the perfusion index is equal to or higher than the determination threshold and the value of force is equal to or lower than the force threshold, the detection device 1A determines the finger Fg to be in the stretched state ST1 and determines the image at that time to be the vein image D10. When the perfusion index is lower than the determination threshold and the value of force is higher than the force threshold, the detection device 1A determines the finger Fg to be in the bent state ST2 and determines the image at that time to be the dermatoglyphic image D20. Thus, the detection device 1 can improve the accuracy of distinction by distinguishing the image based on the perfusion index and the value of the force of the force sensor 150.

In the embodiments described above, the detection devices 1 and 1A have been described as having the configuration including the first and the second light sources 61 and 62, but may have a configuration including only the first light sources 61. The detection devices 1 and 1A may each include the wristband. In that case, the detection devices 1 and 1A only needs to be configured to distinguish the image between a stretched state and a bent state of a wrist.

The components in the embodiments described above can be combined as appropriate. Other operational advantages accruing from the aspects described in the present embodiments of the present invention that are obvious from the description herein, or that are conceivable as appropriate by those skilled in the art will naturally be understood as accruing from the present invention.

What is claimed is:

1. A detection device comprising:
   a ring-shaped housing wearable on a living body;
   a first light source provided inside the housing and configured to emit near-infrared light;
   an optical sensor capable of detecting the near-infrared light; and
   a control circuit configured to control lighting of the first light source, wherein
   the control circuit is configured to measure a perfusion index of blood flow based on image data acquired by the optical sensor when being irradiated with the near-infrared light, determine the image data to be a vein image when the perfusion index is equal to or higher than a predetermined value, and determine the image data to be a dermatoglyphic image of a biological surface when the perfusion index is lower than the predetermined value.

2. The detection device according to claim 1, further comprising a second light source configured to emit red light, wherein
   the control circuit is configured to measure the perfusion index based on the image data detected by the optical sensor when being alternately irradiated with the red light and the near-infrared light, determine the image data to be the vein image when the perfusion index is equal to or higher than the predetermined value, and determine the image data to be the dermatoglyphic image of the biological surface when the perfusion index is lower than the predetermined value.

3. The detection device according to claim 2, wherein a plurality of the first light sources and a plurality of the second light sources are alternately arranged.

4. The detection device according to claim 1, wherein the predetermined value is set within a range from 1% to 50%.

5. The detection device according to claim 1, wherein the housing is a finger ring.

6. The detection device according to claim 1, wherein the control circuit is configured to store a composite image obtained by mapping the vein image and the dermatoglyphic image in a storage circuit.

7. A detection device comprising:
   a ring-shaped housing wearable on a living body;
   a first light source provided inside the housing and configured to emit near-infrared light;
   an optical sensor capable of detecting the near-infrared light;
   a force sensor capable of detecting force of an object inserted in a through-hole of the housing in different states of the object; and
   a control circuit configured to control lighting of the first light source, wherein
   the control circuit is configured to determine image data acquired by the optical sensor when being irradiated with the near-infrared light to be a vein image when a value of the force sensor is equal to or lower than a force threshold, and determine the image data to be a dermatoglyphic image of a biological surface when the value of the force sensor is higher than the force threshold.

8. The detection device according to claim 7, wherein the control circuit is configured to measure a perfusion index of blood flow based on the image data acquired by the optical sensor when the optical sensor is irradiated with the near-infrared light, determine the image data to be the vein image when the perfusion index is equal to or higher than a predetermined value, and determine the image data to be the dermatoglyphic image of a biological surface when the perfusion index is lower than the predetermined value.

* * * * *